(12) United States Patent
Schwarck

(10) Patent No.: US 10,617,948 B2
(45) Date of Patent: Apr. 14, 2020

(54) SYSTEM AND DATA COLLECTION METHOD

(71) Applicant: Matthew N. Schwarck, St. Ansgar, IA (US)

(72) Inventor: Matthew N. Schwarck, St. Ansgar, IA (US)

(73) Assignee: Unonimous, Inc., Saint Ansgar, IA (US)

( * ) Notice: Subject to any disclaimer, the term of this patent is extended or adjusted under 35 U.S.C. 154(b) by 0 days.

(21) Appl. No.: 15/081,044

(22) Filed: Mar. 25, 2016

(65) Prior Publication Data

US 2017/0266542 A1 Sep. 21, 2017

Related U.S. Application Data

(60) Provisional application No. 62/139,122, filed on Mar. 27, 2015.

(51) Int. Cl.
| | |
|---|---|
| A63F 13/46 | (2014.01) |
| G06Q 30/02 | (2012.01) |
| G06Q 20/24 | (2012.01) |
| G06Q 20/12 | (2012.01) |
| A63F 9/18 | (2006.01) |
| A63F 13/792 | (2014.01) |

(52) U.S. Cl.
CPC .............. *A63F 13/46* (2014.09); *A63F 9/183* (2013.01); *A63F 13/792* (2014.09); *G06Q 20/12* (2013.01); *G06Q 20/24* (2013.01); *G06Q 30/0203* (2013.01)

(58) Field of Classification Search
CPC ........ A63F 9/183; A63F 13/46; A63F 13/792; G06Q 30/0203; G06Q 20/24; G06Q 20/12
See application file for complete search history.

(56) References Cited

U.S. PATENT DOCUMENTS

| | | | |
|---|---|---|---|
| 2003/0071416 A1* | 4/2003 | Vancura | A63F 9/183 273/274 |
| 2007/0054728 A1* | 3/2007 | Hood | G07F 17/3244 463/16 |
| 2008/0254419 A1* | 10/2008 | Cohen | G09B 7/00 434/219 |
| 2011/0304100 A1 | 12/2011 | Crapuchettes et al. | |
| 2012/0124052 A1* | 5/2012 | Furey | G06Q 10/00 707/740 |
| 2013/0097513 A1 | 4/2013 | Adarraga | |

FOREIGN PATENT DOCUMENTS

WO WO-2016160556 A1 10/2016

OTHER PUBLICATIONS

Michael Dupee, How to Win on the Buzzer, pulled Mar. 6, 2012 (Year: 2012).*
PCT/US2016/024183 International Search Report and Written Opinion dated Jun. 24, 2016.

* cited by examiner

*Primary Examiner* — Kang Hu
*Assistant Examiner* — Thomas H Henry
(74) *Attorney, Agent, or Firm* — Patterson Thuente Pedersen, P.A.

(57) ABSTRACT

Disclosed is a system of collecting and refining information that may include requesting user inputs and recording user inputs to provide outputs of high purity and high value.

14 Claims, 18 Drawing Sheets

SYSTEM AND DATA COLLECTION METHOD

CROSS REFERENCE TO RELATED APPLICATIONS

This application claims the benefit of U.S. Provisional Patent Application No. 62/139,122 filed with the United States Patent and Trademark Office on Mar. 27, 2015, the entire contents of which is herein incorporated by reference.

BACKGROUND

1. Field

Example embodiments relate to methods of collecting and refining intelligence and a system for collecting and refining data.

2. Description of the Related Art

Data collection methods are relatively common in the art, however, most methods do not provide anonymity. Furthermore, most systems do not provide a motivation to encourage users to engage in the data collection process. Finally, traditional methods do not provide data authentication.

SUMMARY

Example embodiments relate to methods of collecting and refining data and a system for collecting and refining data. In example embodiments, the inventive methods obtain data that is more accurate, more timely, and more relevant than data obtained by traditional methods. As a result, better data is generated more efficiently and for a lower price. Furthermore, through the collection and refining process new market data is created of a type that has never existed previously.

In accordance with example embodiments, a method of collecting data may include asking a question to a plurality of users and obtaining an alpha, beta, and zeta input from each user. The method may also include obtaining just one or any combination of the before mentioned inputs. The method may also include an operation of computing a payout for each user based on a distribution of the alpha data set, a user's beta input, and a user's zeta input.

BRIEF DESCRIPTION OF THE DRAWINGS

Example embodiments are described in detail below with reference to the attached drawing figures, wherein.

DETAILED DESCRIPTION

Figure 1:
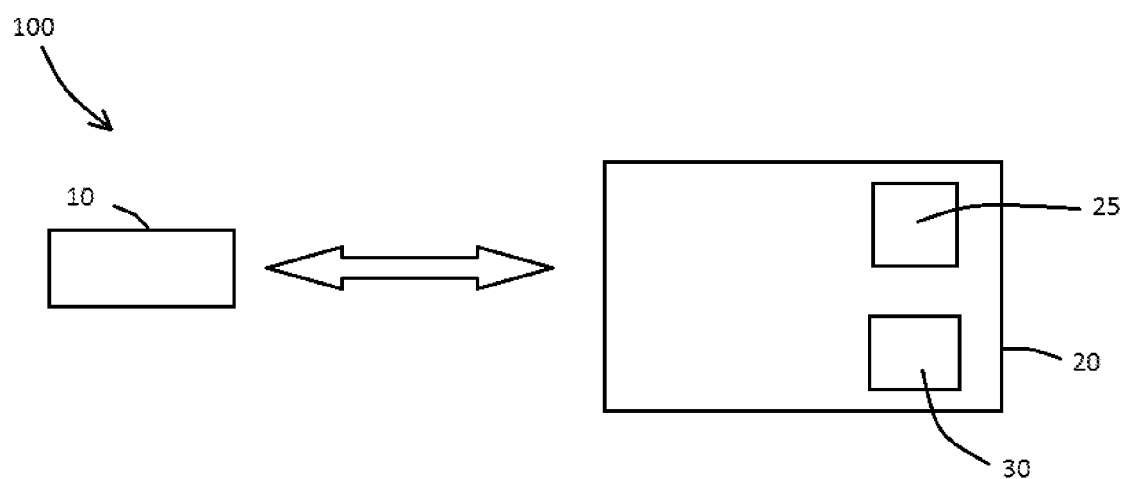
FIG. 1 is a view of a system in accordance with example embodiments.

Example embodiments will now be described more fully with reference to the accompanying drawings, in which example embodiments of the invention are shown. The invention may, however, be embodied in different forms and should not be construed as limited to the example embodiments set forth herein. Rather, these example embodiments are provided so that this disclosure will be thorough and complete, and will fully convey the scope of the invention to those skilled in the art. In the drawings, the sizes of components may be exaggerated for clarity.

In this application, it is understood that when an element or layer is referred to as being "on," "attached to," "connected to," or "coupled to" another element or layer, it can be directly on, directly attached to, directly connected to, or directly coupled to the other element or layer or intervening elements that may be present. In contrast, when an element is referred to as being "directly on," "directly attached to," "directly connected to," or "directly coupled to" another element, there are no intervening elements present. As used herein, the term "and/or" includes any and all combinations of one or more of the associated listed items.

In this application it is understood that, although the terms first, second, etc. may be used herein to describe various elements and/or components, these elements and/or components should not be limited by these terms. These terms are only used to distinguish one element, component, region, layer, and/or section from another element, component, region, layer, and/or section. Thus, a first element, component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to planform views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to methods of collecting data and analyzing data and a system for collecting and analyzing data.

FIG. 1 is a view of a system 100 in accordance with example embodiments. In example embodiments, the system 100 includes a user interface 10 and a network system 20. The user interface 10 may provide a means for a user to interface with the network system 20. For example, the user interface 10 may be a personal device, a handheld device, a gaming console, or other electronic device capable of network interaction and user input, for example, a smart phone, configured to communicate with the network system 20. In example embodiments the user interface 10 may communicate with the network system 20 either directly or indirectly, for example, through the cloud. For example, in some embodiments data and other information may be exchanged over a wireless network, a wired network, and/or a combination of the two.

In example embodiments the network system 20 may include various conventional elements. For example, the device network system 20 may include at least one electronic database 25 that may be used to store various types of data. For example, in one nonlimiting example embodiment, the electronic database 25 may store a plurality of questions which may be provided to a user via the user interface 10. The invention, however, is not limited to one electronic database as example embodiments also provide for a network system having a plurality of electronic databases for storing data. For example, in another embodiment, the at least one electronic database 25 may include a plurality of electronic databases storing various types of data, for example, various types of questions which may, or may not be, arranged in categories, and other more sophisticated methods of arrangement. Of course, in example embodiments the electronic databases may also be used to store data, for example, answers to various questions provided by a user interfacing with the network system 20 via the interface 10. Of course, the network system 20 may include various other elements, for example, nontransitory computer readable-mediums having instructions which may be used by the microprocessors of the network system 20 to control the network system 20. In this application, non transitory computer readable-mediums comprise all computer-readable mediums except for a transitory, propagating signal Further, the electronic databases may store additional types of data such as various corrected user input values that may be used to calculate correlation factors or demographic corrections (to be explained shortly).

In example embodiments, the network system 20 may store additional data. For example, in one nonlimiting example embodiment, at least one electronic database 25 may store data associated with a particular known or anonymous user. For example, in example embodiments, transaction histories for users may be stored in the at least one electronic database 25. Examples of these histories may include, but are not limited to, notification histories, open venture histories, closed venture histories, and currency transaction history. As yet another example, the at least one database 25 may store additional information such as, but not limited to, product data in the event the network system 20 is configured to provide a user an option to purchase, redeem, or otherwise acquire one or more product items.

In example embodiments the network system 20 may further include at least one processor 30, for example, an electronic microprocessor. In example embodiments the processor 30 may be configured to perform various functions such as collecting, processing and refining data. For example, in one nonlimiting example embodiment the processor 30 may be configured to perform various operations such as, but not limited to, providing a series of questions to a user, receiving a series of inputs from the user, coordinating storage of the plurality of inputs, calculating a payout, and calculating various parameters based on answers provided by various users, correlating and refining inputs and data sets based upon user data and other relevant metrics.

In one nonlimiting example embodiment, the system 100 may be used to collect data from various users. In this nonlimiting example embodiment, the system 100 may provide various questions to users and may collect various inputs from the users. The system 100 may also allow users to venture currency which may be, but is not required to be, real currency, digital currency, or crypto currency. For example, in one nonlimiting example embodiment the system 100 may ask a user a question and the user may venture a certain amount of currency on whether the user answered a question correctly. In the event the user speculates correctly, the user may earn currency which may be used to purchase, redeem, or otherwise acquire various items from a store. In one nonlimiting example, products may be available for purchase, redemption, or acquisition in an on-line store managed, at least in part by, system 100. In another nonlimiting example, items may be available for purchase, redemption, or acquisition with said currency outside of the system 100. In example embodiments, information regarding prizes in the store may be stored in the electronic database 25 and the processor 30 may be configured to facilitate purchase of items from the store within the system 100 or outside the system 100.

In example embodiments, the system 100 may implement a novel method for collecting, analyzing, and refining data. In example embodiments, subsystems or byproducts of the system may include or use intelligent growth correlated currency, incentives, feedback, anonymity, user authentication, data authentication, logical gameplay progression, intelligent user profiling, user corporations, digital banks and debt, leveling up/accreditation, taxes, timer, product placement and advertising, psychological modeling, and so on.

In example embodiments the system 100 may provide a virtual environment in which a currency system is established. The currency, which may or may not be crypto currency, which may or may not be an intelligent growth correlated central currency, and which may be hard or soft currency, may allow users of the system 100 to purchase various items from a store, for example, an online store. In addition, the system 100 may allow users to risk their currency in an effort to increase an amount of currency a user has. In one nonlimiting example embodiment, for example, a user may be provided a series of questions and for each question a user may provide a series of answers/inputs. If the user believes they can accurately estimate a popular position as reflected in an alpha data set, the user may venture some of his/her currency. If the user is correct, the user may earn additional currency. If the user is incorrect, the user may lose a ventured amount of currency. The system 100 incentivizes questions with outcomes that are not easily estimated, or stated differently, questions with an alpha data set that represents a more even distribution. In other words, alpha data sets having a relatively even distribution may have a greater payout than whose distributions are not.

Figure 2:
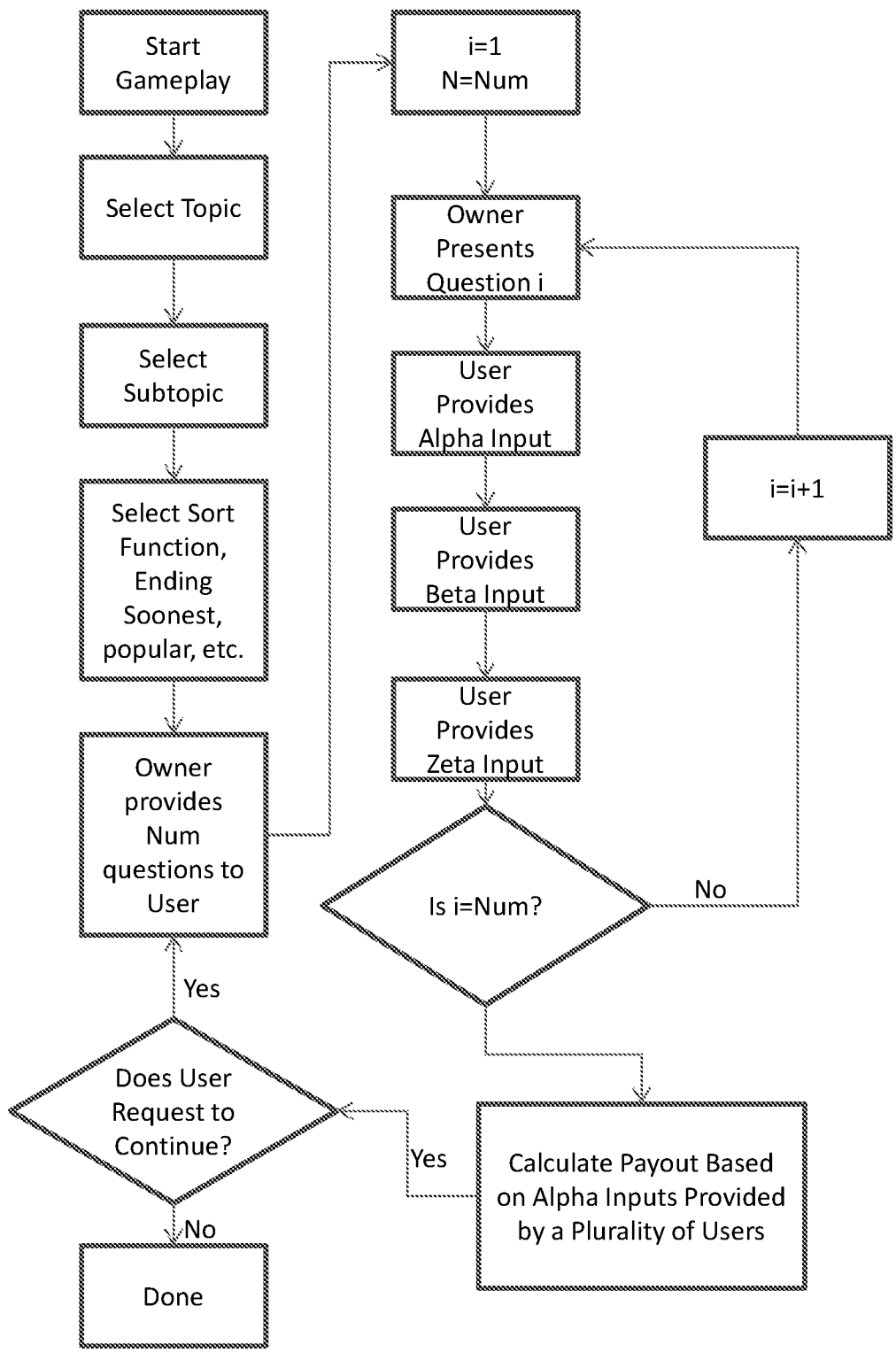
FIG. 2 is a view of a method in accordance with example embodiments.

FIG. 2 is a flowchart illustrating a method of collecting data in accordance with example embodiments. The invention may be carried out via the device network system 100. For example, the processor 30 may be encoded with instructions, or may have access to instructions, to implement the steps of FIG. 2. Referring to FIG. 2, the method begins with a user accessing the system 100 using the user interface 10. In example embodiments, the user may have a login which is not associated with any personally identifiable information. As such, the user of the system 100 may be anonymous on the system. Logging into the system 100 may start the game play. In one nonlimiting example, user login is not required for system 100. In example embodiments, the user may be offered several options for accessing various questions associated with the owner's system 100. For example, the system 100 may provide various topics which may be selected by a user. The topics, for example, may include current events, history, sporting events, politics, etc. The user may also be offered groups of questions related to subtopics. For example, if history is selected, the user may select American history, African history, or European history. As another example, if sporting events was selected the user may select questions related to a specific sport such as, but not limited to, basketball, baseball, football, or soccer. In the alternative, the user may be offered another category of questions such as, but not limited to, popular questions, ending soonest, etc. In this application, "ending soonest" refers to questions which is available for only a limited amount of time and which may be unavailable in a relatively short time in comparison to other questions. Of course, in example embodiments, the system 100 may allow a user to immediately answer questions without selecting a topic or subtopic of questions, as such, the steps of selecting a topic, selecting a subtopic, and selecting sort function, ending soonest, popular, etc., may be omitted. Regardless, the system 100 in example embodiments may provide the user access to intelligent groups of related questions after the user has entered into the system 100.

In example embodiments the questions presented to a user may be either definitive or non-definitive in nature. For example, a question may ask how many states are in the United States. Such a question is definitive in nature. However, the question may, instead of being definitive, be non-definitive. For example, the system 100 may ask the user "Should Puerto Rico be made a state?" This question has no right or wrong answer and may be an example of a non-definite question.

In example embodiments questions may be repeated from time to time. For example, the system 100 may provide the user a question related to a sex of a person. For example, the system 100 may ask the question "Are you male or female?" The system may record this information and then re-ask the question at a later date. Re-asking the question may serve to authenticate or validate a user. Furthermore, the date the question is asked and answered may be recorded so that the user's answer may be retrieved at a later date and compared to the user's later answer when the question is repeated.

In example embodiments, the method according to example embodiments may include having the system 100 present a user a series of questions and having the user provide data inputs to the system 100. For example, in FIG. 2, the system 100 may provide a group of questions having Num questions therein. In example embodiments, Num may define only a few questions, for example, one, two or three questions, or several questions, for example, dozens or even hundreds of questions. In the method of FIG. 2, the user is presented a question and the user has the opportunity to provide an alpha input, beta input, and zeta input for each question. This data may be recorded in an electronic database, for example, the electronic database 25 of FIG. 1. In example embodiments, the alpha data is personal to the user, the beta data represents what the user believes is true of a group of users, and the zeta data is related to currency which may be risked by the user. For example, the number of questions (Num) provided a user may be three questions and the three questions may be: 1) "Do most people rent or own their residence?;" 2) "Which navy has the most submarines: A) Russia; B) United States; or C) China?;" and 3) "What item is most valuable in an emergency: A) Shelter; B) Weapon; C) Cell phone; D) Money; or E) Food?" In example embodiments a user may provide the alpha input, beta input, and zeta input for each question. For example, if the user believes most people rent, the user may communicate this to the system and this data may be stored as an alpha input. If the user believed that most people believed that most users who provided alpha inputs selected "own," then the user may select "own" as their beta input and communicate this to the system 100. This input may be stored as a beta input. If the user believed their beta input was the same as the most popular alpha input, the user may risk a certain amount of currency, for example ten (10) Zeta (assuming Zeta is a name for the currency used by the system 100). If the user was correct in selecting the beta input which corresponded to the most popular alpha input for all users, the user may receive a payout, if not, the user may lose his/her risked currency.

Figure 10:
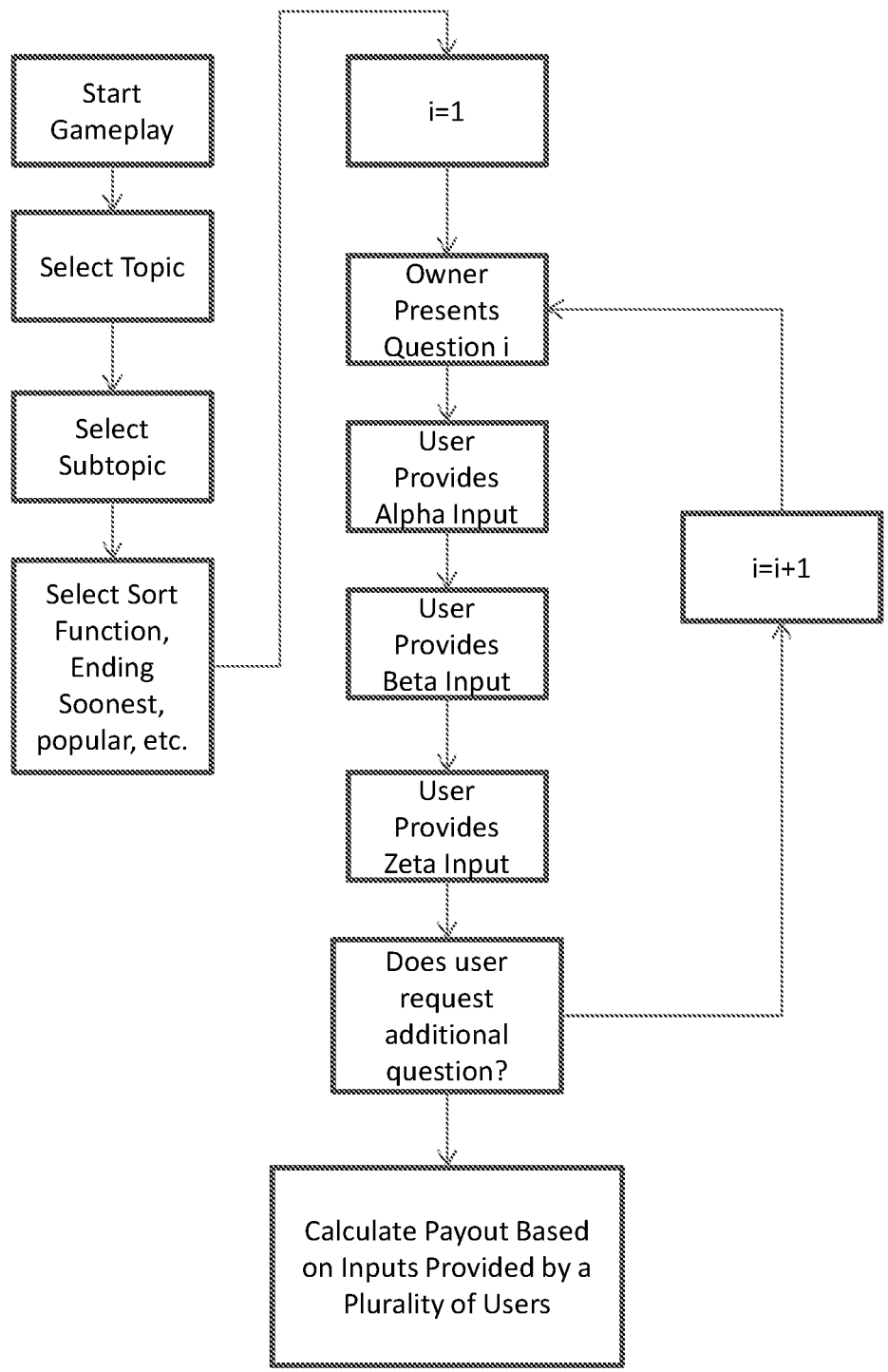
FIG. 10 is a view of a method in accordance with example embodiments.

The embodiment of FIG. 2 is not meant to limit the invention. For example, as shown in FIG. 10, rather than having a method in which a number of questions NUM is provided to a user, the method may include an operation in which a user is provided an option of requesting another question. If the user requests another question, as shown in FIG. 10, the system may ask an additional question and the user may provide additional input.

In example embodiments, the questions may be disclosed to a plurality of users and the system 100 may record the alpha, beta, and zeta inputs from each of the users. For example, in example embodiments, the alpha, beta, and zeta inputs may be recorded for each user in the electronic database 25. It is understood that the architecture described in FIG. 1 is for purposes of illustration only and is not intended to limit the invention. For example, whereas FIG. 1 illustrates only a single electronic database 25, it is understood symbol 25 may actually represent a plurality of electronic databases across which data is stored in one or more locations performing one or more independent functions. Similarly, although FIG. 1 illustrates a single processor 30, it is understood symbol 30 may represent a plurality of processors for implementing the methods of example embodiments.

In example embodiments, a question may be provided to a plurality of users and the plurality of users may generate a plurality of individual alpha inputs, a plurality of individual beta inputs, and a plurality of individual zeta inputs for the question. In this application, a collection of individual alpha inputs generated by the plurality of users is referred to as an alpha data set and a collection of beta inputs generated by the plurality of users is referred to as a beta data set. In example embodiments, the alpha data set may be a basis for calculating the payout for speculation and a user's beta input may be a basis for awarding a payout for speculation. The zeta input is the amount of currency the user has risked based upon their beta input. The plurality of all zeta inputs for a question is called the zeta data set. The greater the amount of currency risked, the greater the amount of potential gain and/or loss. Thus, Zeta input may be an indicator as to how confident a user is in their Beta input. Inputs include user selection/preference and the amount of time for user to make selection/preference. In other words, the system 100 of example embodiments may not only record the alpha, beta, and zeta inputs from each player, but the amount of time it took to make each respective selection.

Other factors may also affect a user's/player's payout. For example, in one nonlimiting example embodiment, the system 100 may keep track of, for example, in an electronic database, all of or some of the users' net worth of zeta and may use a user's net worth to modify a payout. For example, those with a higher net worth may have a lower payout than those having a lower net worth despite providing the same alpha, beta, and zeta inputs as a higher net worth player. As another example, the system 100 may also keep track of how often a user logs into the system and may adjust the user's payout based on the number of times the user has logged into the system 100. For example, the system 100 may give users who have a higher participation rate a higher payout than those with a lower participation rate on a particular question despite having the same alpha, beta, and zeta inputs for the particular question. As another example, the system 100 may track how many questions a user has answered and may adjust the payout based on the number of questions a user answered. For example, a first user who answered more questions than a second user may receive a higher payout on a question than the second user despite having the same alpha, beta, and zeta input provided the first user answered more questions than the second user.

Table 1 is an example of a collection of data obtained from six (6) users of Applicant's system 100: Bill, Hillary, George, Laura, Ronald, and Nancy. In Table 1, each user was asked three (3) different questions (in this case, Num=3). The first question is: Do most people rent or own? The second question is: Which navy owns the most submarines: A) Russia; B) United States; or C) China? The third question is: what item is the most valuable item in an emergency: A) Shelter; B) Weapon; C) Cell phone; D) Money; or E) Food?

In this particular nonlimiting example, the alpha data set for this group would be {Rent, Rent, Own, Own, Own, Own} for question 1, {B, B, C, A, B, B} for question 2, and {A, B, B, B, D, D} for question 3. The Beta data sets for this nonlimiting example are {Own, Own, Own, Own, Rent, Rent} for question 1, {C, C, C, A, B, B} for question 2, and {A,A,A,A,A,A} for question 3. The Zeta data sets for this nonlimiting example would be {50,50,100,50,25,25} for question 1, {10, 10, 50, 50, 25, 25} for question 2, and {20,20,5,5,50,50} for question 3.

In this particular nonlimiting example, payouts for individual players will be a function of at least two parameters: 1) whether the individual player's beta input reflected the most popular alpha input within the alpha data set; and 2) the actual distribution of results in the alpha data set (or a type of refined alpha input, which will be explained later). For example, in the nonlimiting example of Table 1, the most popular answer as to whether individuals rent or own their properties, in the alpha data set, was "Own." Thus, because each of Bill, Hillary, George, and Laura's beta input matched the most popular alpha input in the alpha data set, each of Bill, Hillary, George, and Laura may win a certain amount of currency, the amount thereof being dependent on the distribution of answers if the first alpha data set. Similarly, for question 2, the most popular alpha input in question 2's alpha data set was "B" (corresponding to the United States having the largest navy). In this particular example, because Ronald and Nancy were the only ones with a beta input which matched the most popular alpha input in question 2's alpha data set, only Ronald and Nancy may win a certain amount of currency (the amount thereof being dependent on the distribution of answers if the first Alpha data set). Similarly, for question 3, the most popular alpha input in the alpha data set is B (corresponding to a weapon). However, because none of Bill's, Hillary's, George's, Laura's, Ronald's, and Nancy's beta input matched the most popular answer in the alpha data set (i.e. shelter (A)), none of Bill, Hillary, George, Laura, Ronald, and Nancy may receive a payout and each may lose an amount of currency related to their zeta input.

Actual payout calculations may be defined by an owner of the system 100. For example, one nonlimiting payout algorithm may expressed as the equation $$P=(1-PW)/PW$$

Where P=payout
PW=winning percentage.
For example, for question 1, the payout $P=(1-4/6)/(4/6)=0.5$ whereas the payout P for question 2 would be $P=(1-3/6)/(3/6)=1.0$. Thus, Bill's zeta would increase by 25 zeta (0.5*50) whereas George's zeta would increase by 50 zeta (0.5*100) based on their answers to question 1 and the amount of zeta ventured. Of course, other equations may be used to calculate a payout. For example, an owner of the system 100 may decide to augment the above Payout calculation with a

|        | Question 1 |       |         | Question 2 |      |         | Question 3 |      |         |
|--------|------------|-------|---------|------------|------|---------|------------|------|---------|
| User   | Alpha      | Beta  | Zeta (Z)| Alpha      | Beta | Zeta (Z)| Alpha      | Beta | Zeta (Z)|
| Bill   | Rent       | Own   | 50      | B          | C    | 10      | A          | A    | 20      |
| Hillary| Rent       | Own   | 50      | B          | C    | 10      | B          | A    | 20      |
| George | Own        | Own   | 100     | C          | C    | 50      | B          | A    | 5       |
| Laura  | Own        | Own   | 50      | A          | A    | 50      | B          | A    | 5       |
| Ronald | Own        | Rent  | 25      | B          | B    | 25      | D          | A    | 50      |
| Nancy  | Own        | Rent  | 25      | B          | B    | 25      | D          | A    | 50      | global payout multiplier. This latter nonlimiting payout algorithm may be expressed as $P=(G/PW)*(1-PW)$ where G is the global payout multiplier. The global payout multiplier may be any number selected by the owner of the system 100, for example, 1 or 2.

In example embodiments it is envisioned that the distribution of alpha data may, from time to time, produce a tie for a most popular answer. For example, in the preceeding example, if Hillary had chosen A instead B as the alpha input for question 3, then the alpha data set for question 3 may have been {A, A, B, B, D, D}. In this latter case, A, B, and D are tied as the most popular answer in this alpha data set. In order to break this tie, the system 100 may be configured to send a notification to the owner of the system 100 and the owner may input one or more alpha inputs to break the tie. In the alternative, the system 100 may be programmed with a function to randomly pick the most popular answer in an alpha data set where there is a tie. That is, amongst the alpha data tied for a most popular answer, the randomize function may break the tie between the most popular answers. For example, a randomize function of the data set {A,B,D}, the most popular answer in the data set {A, A, B, B, D, D}, may randomly pick either A, B, or D as the most popular data in the alpha data set and the payout may be based on the answer selected by the randomizer. The system 100 may also be configured to award a payout to all of the answers that were tied as most popular. That is, if the popular position to a given question was 50%/50% both potential answers would receive a payout.

In at least one example embodiment, the system 100 may be configured to provide users a predetermined amount of currency the first time a user plays. For example, in one embodiment, a user may be provided ten thousand zeta. The system 100 may be further configured to provide the user with additional zeta each time a game is played. For example, in another embodiment, the system 100 may provide a user one thousand zeta every time a game is played. In these latter embodiments it is possible for a user to obtain a great deal of "free" currency for using the system 100. In order to prevent a user from acquiring too much "free" currency, the system 100 may be further configured so as not to provide a user "free" currency when the user's account contains more than a predetermined amount of currency. For example, in another embodiment, a user who has an account containing more than ten thousand zeta will not be awarded "free" zeta each time a game is played until which time that user's currency total may drop below ten thousand zeta. In yet another embodiment, the system 100 may implement a "gifting program" in which a set a dollar amount (for example, five dollars) may be given to users for simply signing onto their system. A certain amount of this money, for example, half of the money, may be given to the user in zeta. Zeta, in the inventor's system, may have an exchange rate which may, or may not, vary over time. For example, if the exchange rate when a user logs in is ten to one, then the user may be given twenty five zeta which corresponds to $2.50. The remaining money may be given over time. For example, the remaining $2.50 may also be converted to zeta and then dispersed over time. For example, in one embodiment, the remainder may be dispersed over the next five times a user logs in, provided the logins are separated by a preset amount of time, for example twenty four hours. In example embodiments, this "gifting program" may be implemented only in cases where a user's net worth in zeta is below a threshold value. The threshold value, however, may be calculated by the system and may be a function of various parameters such as, but not limited to, the dollar amount of prizes available to a user or the amount of zeta in the system. As such, the threshold value may change over time and may be relatively high at one point in time and relatively low in another point of time. Of course, the exchange rate may also be calculated by the system and may also vary as a function of the amount of zeta in the system and/or the dollar amount of goods available.

In a nonlimiting example, user may speculate all available currency which is held in an electronic escrow until which time a question ends, payout is computed, and user's account balance is adjusted. If the user has no available currency to risk the user may still provide alpha, beta, and zeta inputs. However, the zeta input will default to zero. This will be noted in the zeta input and zeta data set as the user had no available currency which may represent a different intent than a zeta input of zero if the user had currency available to speculate.

However, in at least one example embodiment, the system 100 may be configured to provide a virtual banking/lending system so that a user may actually borrow currency and risk the borrowed currency, in other words, acquire debt and leverage available currency, pay interest and risk potential insolvency or default. In another embodiment one player may simply borrow currency from another player. However, in this latter nonlimiting embodiment, any transfer of currency between players must pass through a processing algorithm. In other words, the system 100 may act as a central authority to approve a transfer of currency from one player's account to another's, provide fraud protection, and correct for discrepancies in the system. In another example embodiment the currency may be used outside of the system 100 as a currency for the exchange of goods. For example, in one nonlimiting example embodiment, a user could use zeta to buy products on an online company, for example, amazon.com or paypal.

The inventor has also contemplated a scenario where a fraudulent party enters into the system and poses as an authentic/legitimate party. In this case, the fraudulent party may attempt to purchase various goods using the authentic/legitimate party's currency. In order to prevent this from happening, the inventor contemplates a fraud protection system where the system 100 is configured to detect fraud or minimize the impact of fraud. For example, suppose the authentic/legitimate player logs into the system 100 and determines a number of unauthorized transactions have taken place. In this case, the authentic/legitimate player may alert system 100 of the fraud and the system 100 may correct the product purchases and adjust the authentic/legitimate player's account holdings. This method may be enabled, for example, by introducing a time lag (for example, one, two, or three days) between a purchase order placed by a user and a purchase order placed by the system 100 to an actual supplier of a goods. In the interim, the system 100 may send a message to the second player alerting him/her of the purchase order giving them a chance to terminate the order. In this event, the system 100 may terminate the order and adjust the authentic/legitimate player's currency holdings.

It is understood that questions may or may not have the same payout and the payout may not be calculated until all alpha inputs for a question are collected from a plurality of users. In example embodiments, the payout may be based upon the distribution of the alpha inputs within the alpha data set. In one embodiment, the closer to an even distribution, the higher the payout. Said another way, the payout may be higher for a yes/no question with a 51%/49% distribution than a yes/no question with a 98%/2% distribution. This may incentivize the answering of questions where the outcome may not be easily estimated, because these are potentially the questions that most users are most interested in and the questions that may have the most valuable data sets. In example embodiments, the inventor's system 100 and methods may allow for the potential for all users who provided alpha, beta, and zeta inputs to a specific question to "win" at the same time or lose at the same time, or all receive a payout or all users lose risked currency, respectively This aspect of example embodiments differs from the current state of the art which dictates generally that winners can only win in relation to what losers lose, a generally balanced system.

In example embodiments the currency used in the system may be digital. For example, in one example embodiment, digital currency, called Zeta and represented by the $z$ symbol, may be earned by using the system 100 and answering questions and speculating on outcomes. Rather than having a balanced system where a user can only win what others lose, the system 100 of example embodiments may use a dynamic currency system where all players can win at the same time or lose at the same time. In one embodiment, if the amount of currency in circulation increases then the price of prizes in the store may increase. Or if the available goods decreases and currency in circulation stays the same then the price of the goods may increase. This is different than the current state of the art where winners can only win what the others lose. It is emphasized that in at least one example embodiment, the system 100 may function as a central authority having the ability to create and destroy currency. Since the system 100 may be configured to create currency, there is a potential for all players to risk currency and win currency. In this case, the total amount of currency managed by system 100 may increase. On the converse, it is also possible that all players may risk and lose currency. In this latter case, the overall amount of currency managed by system 100 may reduce.

In example embodiments, the device network system 20 of system 100 may have an online store and currency utilized by system 100 may be used by users to purchase products from the online store. In one example embodiment, a vendor may pay money to owner of system 100 to host vendor's product in the online store. The money paid by the vendor may go into a pool of funds which includes similar monies paid by other vendors. Some of the money may go to paying operating expenses and the remainder may be available to users to purchase, redeem, or acquire products in the online store. For example, if there is $z$ 10,000,000 in circulation in the system and $1,000,000 in prizes, a $6 deck of playing cards may cost $z$ 60, the $6 then being debited from the pool of funds available for prize purchases and being placed in an escrow account to be paid to vendor upon request, or some other method of remittance as the owner deems fit. If there was $500,000 in the pool of money for prizes, a $6 deck of playing cards may cost $z$ 120.

In a practical implementation of example embodiments, a vendor may provide additional compensation to the owner of the system 100 to have their product featured within additional areas of the system outside of the online store, such as a pause screen. In this example embodiment, when a user selects a product from the online store they may receive the product directly from the vendor. User may pay all tax, shipping, and other applicable fees. The system 100 according to example embodiments may not stock any products. Rather, the system 100 may generate a voucher for the purchase under $600. This voucher may utilize a coupon code entered at checkout. The system 100 may then be billed by vendor for the amount. The owner may then provide funds to the vendor from the escrow account holding funds for purchased products. The owner of the system 100 and vendor may have negotiated the cost of the product at the time of contract execution before the product is in the store which includes both resale and wholesale price. In one embodiment, the user of the system 100 may pay vendor wholesale price for the product. So, a user may buy a $60 product which may not mean that the pool of prize money is debited $60. If the wholesale price of that product was agreed to be $30 then the prize money pool may only be debited $30. $z$ cost, however, may be based upon retail cost. The system owner 100 may then be able to deduct the $30 from its taxes as a business expense. Vendor may be able to deduct up-front payment and ongoing per-click payments.

For the purchase or acquisition of a product with a retail value of over a certain amount, for example, $600, there may be tax implications. Users may need to provide name, address, and social security number so the system 100 can send users tax information. Out of state residents may find that these winnings are also taxable in their home state. However, the out of state resident may claim an out-of-state tax credit for the tax paid to the other state.

In use, there may be a sales tax exemption for property purchased for use as a prize to players and it may not be subject to a state's sales tax, for example, Iowa sales tax. The winner of the prize may not be obligated to pay the sales tax either. This exemption may include the purchase of a motor vehicle subject to registration. Note: winners of gift certificates may be required to pay sales tax when they make purchases using the gift certificates.

Example embodiments of system 100 may utilize a novel process for collecting user demographic information. Instead of requiring users to provide information up-front at time of registration or beginning service, the system 100 may populate demographic information through the process of gameplay. For example, during game play, the question "What is your sex? male/female?" may be asked and the user's response may be recorded and used to populate the player's demographic information. Users may skip questions, so this may not necessarily mean that this information will be provided by the user. However, a user may (and probably would) like to know if there are more males/females using the system 100 so they may answer the question because, in at least one example embodiment, if a user doesn't answer a question the user cannot see the outcome, which can also be described as the distribution of refined data as represented in the alpha data set. In example embodiments, there may also be currency penalties for skipping questions.

In example embodiments, when a user provides an alpha input to a question the user may be able to see the outcome of the alpha data set as a function of percentage, for example, 62% YES/38% NO, users, however, in example embodiments, may not be able to see how many responses there were. The inventor believes the ability to see how a user's peers view issues is a strong incentive for answering questions. As described above, in at least one embodiment, if a user skips a question and does not provide an Alpha input, the users sees nothing—no feedback regarding that question. Users do not see the B data set or any other data. However, it is envisioned that users may "level up" and accordingly may have more detailed and sophisticated information available.

In example embodiments the alpha data set may include refined data. The system 100 may utilize a novel data refining system utilizing correlation and authentication, among other processes to ensure representative data samples. User data inputs may provide demographic data on a user. It is important to note, again, that users, in at least one embodiment, may be anonymous on the system 100 and all demographic data may be linked to an alias with no personally identifiable information. By using this information and the information from other previously answered questions the system 100 may be able to account for non-genuine users, fake users/bots, and other non-desirable user traits. For example, certain questions may be asked periodically on a recurring basis. If the user provides differing answers to the same question over time, this may be a red flag. If a user demonstrates non-uniform question response times, this may also be a red flag. For example, if a user answers questions at 1 s, 1 s, 1 s, 16 s, 1 s . . . it may be obvious that the user may not reading the questions, or more accurately, may be scanning the questions for a particular question or topic. Furthermore, this user may have only speculated on the fourth question where they spent 16 s. The inventor does not believe that this user should be removed from the system. Obviously, in an embodiment where a user is penalized for skipping a question, this user may have determined there may be a penalty for skipping a question, but no penalty for just clicking an answer to a question they are not interested in. These inputs from this user may provide flawed information, for example, flawed demographic information, and skew the alpha data sets for the questions they did not answer thoughtfully. For these reasons only the fourth question may be counted for this user. Counted means that this alpha input may be used in the distribution for payout computation. Furthermore, the system 100 may be able to provide varying corrected user input values to the user inputs. For example, User H may have a corrected user input value of 1.7 applied to their input while User K may have a corrected user input value of 0.3 applied to their input. It is also anticipated that certain users will believe that, statistically, they have a higher likelihood of speculating on the more popular answer if they always have the same A and B inputs, regardless of what they individually believe. The methods of example embodiments may not remove users from the system, however, the system may disregard their alpha inputs towards the alpha data set and therefore the distribution for inputs deemed unreliable. Their beta inputs however, may be valuable and well thought out. Furthermore, these "AB" same users may have demonstrated a certain intelligence and strategic capability and may represent the type of user that the system may focus on "leveling up" to stop this type of play. The "leveling up" of users may be not only important to keep users interested but to also allow for better data collection in the system.

In example embodiments, the system 100 for data collection and authentication is vastly superior to the current state of the art. Not only is the information more accurate and specific, but the information is timely. With the system one may be able to tell if a user had a child and when, if the child was a boy/girl, if a user was divorced and when, if a user bought a house and when, if it was their first house, if a user bought a car and when, if it was a hybrid, if it was Japanese, etc. In at least one example embodiment, a system guarantees a level of anonymity since, in this embodiment, a player uses an anonymous login and the system does not store any personally identifiable information. In this latter embodiment users are not allowed to leave comments, photos, or any posts that may compromise identity. Furthermore, in at least one example embodiment, user speculation history may be deleted from account after a period of time which may be more or less than 24 hours and Alpha data inputs are not viewable in any user accounts.

In example embodiments, questions may be intelligently designed and linked to build upon each other. In the same way that an intelligently designed security clearance examination will seek to understand whether a person is reliable, trustworthy, of good conduct and character, and loyal to the U.S., the system 100 may seek to understand individuals in a sophisticated way.

In example embodiments a user may exchange currency in the game for products in a store, which may be an online store, in or outside the system 100. The store may host a variety of products, the quality of which may be determined by the system operator/owner. For example, in one embodiment, an operator of the system 100 may require products in the store be: 1) the best of their kind; 2) made in America; and 3) satisfy any other personal requirements set forth by the system operator. In one embodiment, the store may only have one product per market segment. For example, if the market segment is sunglasses, several vendors, for example, American Optical, Randolph Engineering, Oakley, etc. may all bid for one spot in the store. This may be done monthly via a closed or open bid process.

In example embodiments, these product requirements may be carefully and specifically selected so as to create a store with products that will be attractive to the initial niche of users that the system is targeting. It may also be important to cultivate a luxury affluent image of the system 100. At a certain point when this niche has been fully utilized, products may shift focus towards a new niche, for example, professional women, then another niche, etc. At some point there may be a necessity for increased revenue from vendors. At this point more lucrative market segments may be targeted, such as luxury autos, cell phones, etc., open to manufacturers from all regions. However, the luxury/quality/best of kind and personal approval requirements may still exist.

In example embodiments products may be "bought" by the users, so a company, for example, Oakley, may only pay $17,000 for their product to be hosted in the store but move $23,000 worth of goods. It is anticipated that the store may grow to encompass a relatively large number of products and market segments, for example, approximately 250 products in 250 market segments, representing the best of the best and "the place" to have your new product for launch. It is understood, however, that the store may encompass more or less than approximately 250 products in 250 market segments.

In at least one example embodiment, the system 100 may make available a dollar amount, for example, about $10, per user per year in products awarded at full scale. This may begin at a relatively low level, for example, about $2 per user per year, and may increase thereafter. Even this value of $2 per user per year is well above and beyond any existing incentive system. Most importantly, this incentive system scales. The more users the more products, the more products the more users, the more users the more products, and so on, and so on. Furthermore, it is postulated that when a user is in the mindset that they are using the system 100 to be entertained, be educated, and to shop they are much more receptive to the product information and much more likely to make a purchase. As such, a user may be disinclined to leave the gameplay session while on the system 100. There are likely no breaks in the gameplay for anything that is not related to the system 100. In example embodiments, the system 100 may be configured so that one playing the game will not accidentally click on an advertisement that may take the user away from the system to something the user is not interested in.

In at least one example embodiment, it is anticipated that the average user will answer approximately 52 questions per session with approximately 3 sessions per week. This equates to over 8,000 questions per user per year and over 24,000 inputs per user per year. This equates to approximately 66 hours of gameplay per user per year or approximately 1 hour and 15 minutes per week. This, however, is not a limiting aspect of example embodiments as the average player may answer more or less than about 52 questions per session and may participate in more or less than 3 sessions a week.

The system 100 of example embodiments favors quality over quantity, both in responses per user and users on the system 100. Users targeted for participation may fit the description of "important".

The system of example embodiments may utilize a new method of question input and administrative oversight. In at least one example embodiment users do not create questions. Only the owner, in some embodiments, may create questions. These questions may be intelligently created to build on each other and relate to each other. That is, some questions may be created with intentional correlations to one another and the various correlations may be stored as data in the electronic database 25. This data may be usable for helping to correct user input values with regards to the alpha inputs and alpha data set as will be explained later.

In example embodiments, the questions may not be specific to one specific company but rather to a market or industry. Questions may be created with a thought towards creating a valuable data set. This represents a difference between the system and trivia games. Most companies may not pay for a data set regarding a trivia question but may pay for a data set regarding business, politics or product marketing such as, whether employees prefer additional vacation or bonuses. Furthermore, the system 100 focuses on unknown questions whereas trivia games have only questions with known answers.

In example embodiments, when answering questions (i.e. providing alpha, beta, and zeta inputs) there may be a timer for each input and the timers may be different for each question or input, but the timer may generally be around 20 seconds per input for a total of 60 seconds per question. It is anticipated that users may take any portion of the time or all of the available time per question to answer. The timers may be intelligently designed to take into account the number of characters in a question, the number of potential answers, the number of characters in the answers, and a manual input for the general difficulty of the question. Thus, for example, a timer for the question "Do most people rent or own: A) Rent or B) Own?" may be shorter than a timer for the question "What item is the most valuable item in an emergency: A) Shelter; B) Weapon; C) Cell phone; D) Money; or E) Food?"

Throughout the process of gameplay users may be able to "level up" which, in this application, may mean becoming an accredited player. In example embodiments, certain players may develop certain gaming habits which, while logical on a personal level, may be detrimental to the data gathering process as a whole. These users may be targeted to become accredited players in the system 100. One can become an accredited player by reaching a certain amount of wealth (for example, in Zeta), having a certain level of income for a certain period of time, or demonstrating sufficient knowledge. This more advanced version of gameplay keeps users interested and challenged when playing.

On the subject of knowledge, it is anticipated that there may be supplemental "tests" that are independent of the gameplay process. These tests may be conducted to measure knowledge and better understand users. These tests may be around ten questions and may be unlike other questions in the game and may have actual correct and incorrect answers and only one input per question which may include selection and time to make selection based upon timer.

In example embodiments, expanded features may be available to accredited players. The inventor, for example, anticipates that the system 100, which may include a monetary system, may help educate users on the concepts of corporations, banks, and lending. In another example embodiment, the system 100 may allow for certain levels of accreditation. Upon becoming accredited players at a certain level users may have the opportunity to create corporations wherein users can pool assets and allow a single "manager" to make investments. Corporate shareholders, however, in one embodiment may not be able to see what specific questions the manager is answering and how the outcomes of those specific questions are distributed, however investors may be able to monitor performance in certain sectors. Investing in a corporation in this way may allow for passive income.

In example embodiments, a round of gameplay may consist of one question and four screens provided to a user and the user may provide: 1) the user's personal viewpoint and time it took to select viewpoint (alpha input); 2) the user's estimation of the popular viewpoint and time it took to select popular viewpoint (beta input); 3) the amount of currency risked by the user and time it took to select amount of currency to be risked (zeta input); and 4) pause/product screen—where updated account information may be presented, navigation features may be presented, and a sponsored product may be featured. In example embodiments, a new round may be started with a new question. These aspects of example embodiments are not meant to limit the invention. For example, in example embodiments a user may not directly provide the times it took to provide a personal viewpoint to a question, an estimation of the popular viewpoint, and to risk currency. Rather, these times may be obtained by the system 100 which includes timers that time how long it took for the user to enter each of the aforementioned data. Also, while the above example illustrates an embodiment where the system 100 provides data in a manner that causes a user interface 10 to display a question across three different screens the system 100 may alternatively be configured to cause the user interface 10 to display a question on a single screen and allow the user to enter their personal viewpoint to a question, an estimation of the popular viewpoint, and an amount of currency to risk all on the single screen.

Figure 3:
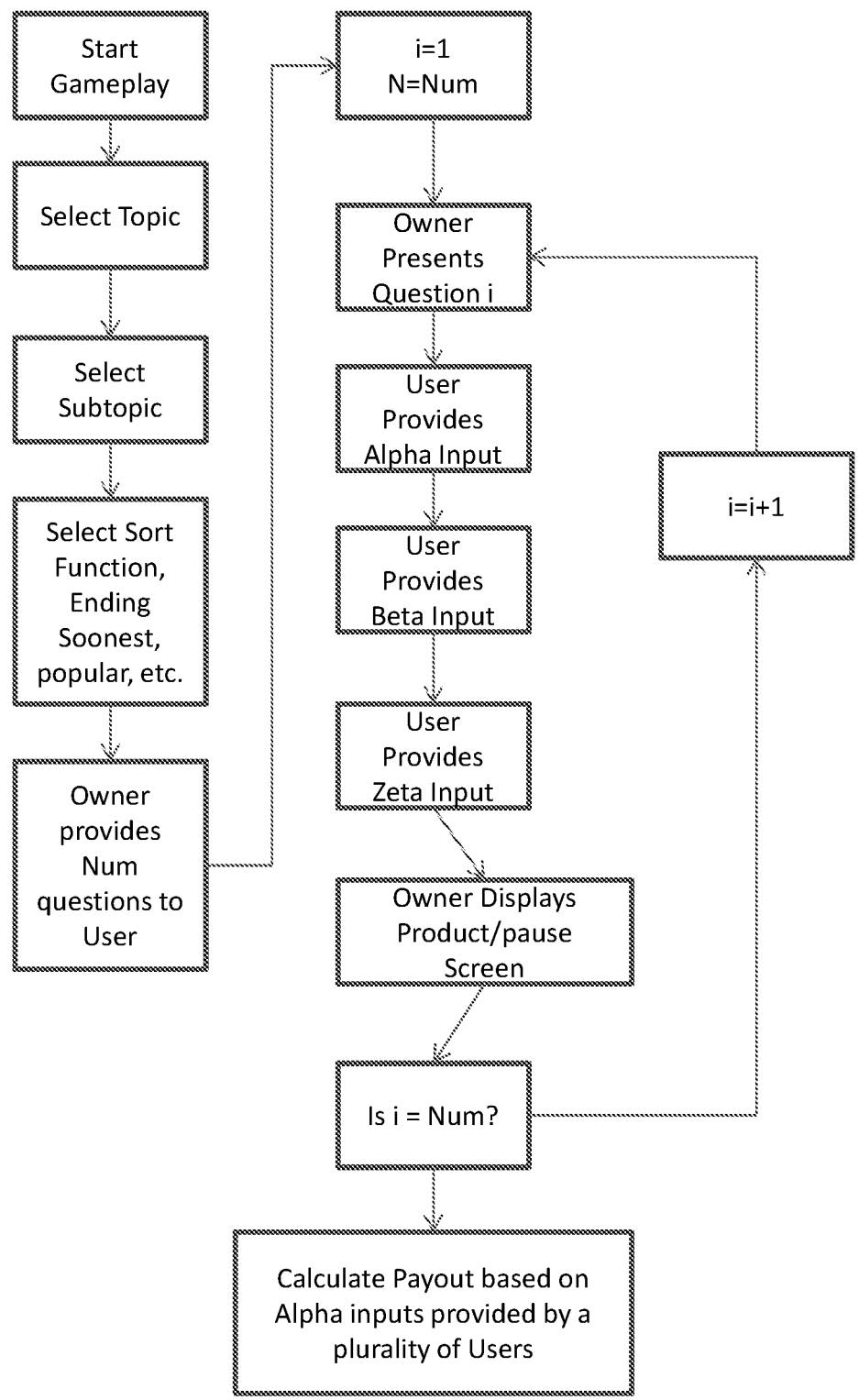
FIG. 3 is a view of a method in accordance with example embodiments.
Figure 11:
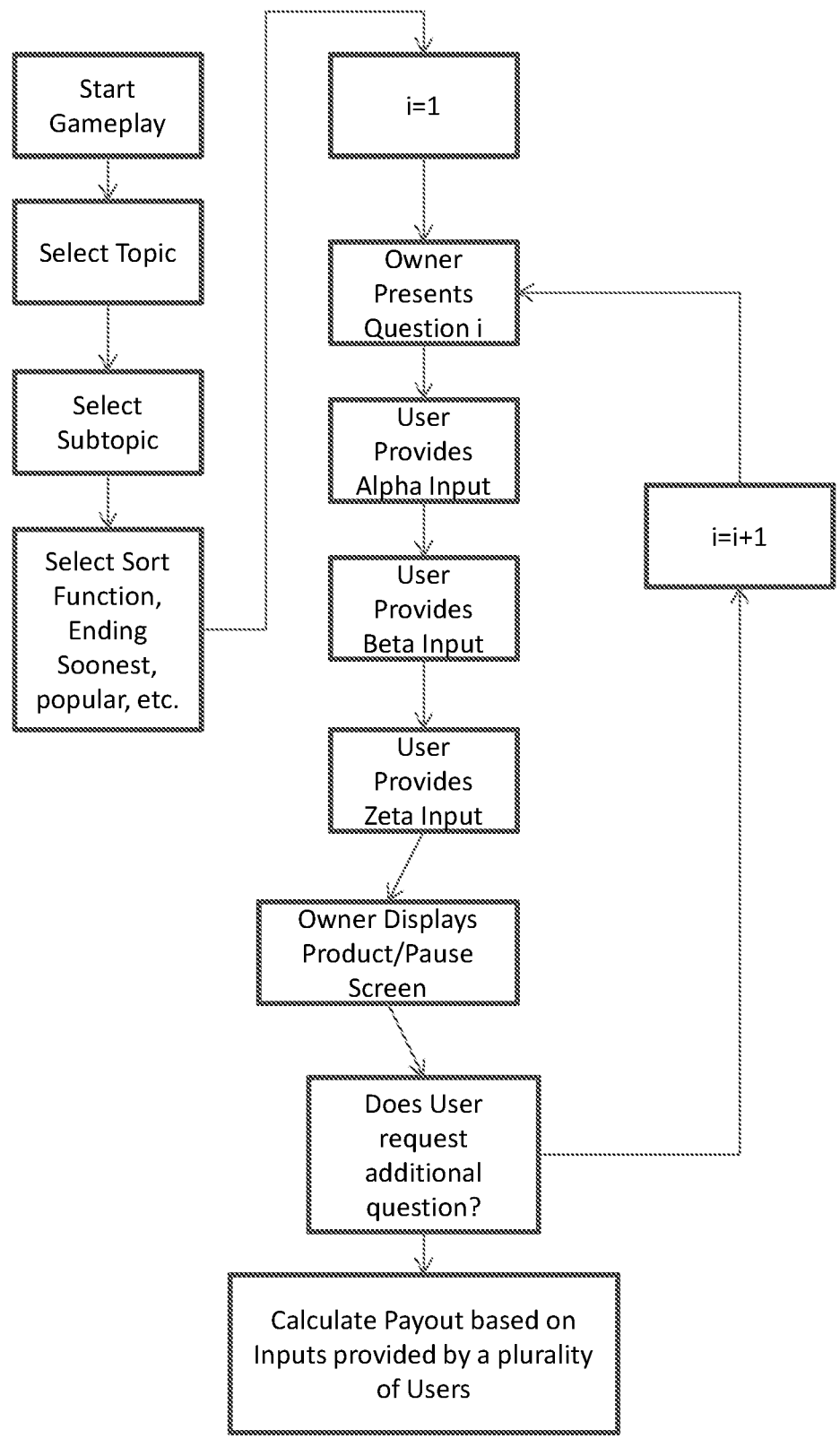
FIG. 11 is a view of a method in accordance with example embodiments.

FIGS. 3 and 11 present methods which are substantially the same as FIGS. 2 and 10, however, the methods of FIGS. 3 and 11 include an extra step of presenting a user the pause/product screen. In example embodiments, the product screen may present a product available in the store managed by system 100. In example embodiments the product screen may be available after every round of input as shown in FIGS. 3 and 11, however, it is also envisioned that the product screens may be shown after every other round of input, every third round of input, or after any number of rounds of input the system owners deems appropriate. This option may be important for users who are not interested in frequently seeing a product screen. In example embodiments this option may be provided to the user and the user may define how often the product screen is displayed or may be determined by the system owner.

Figure 4:
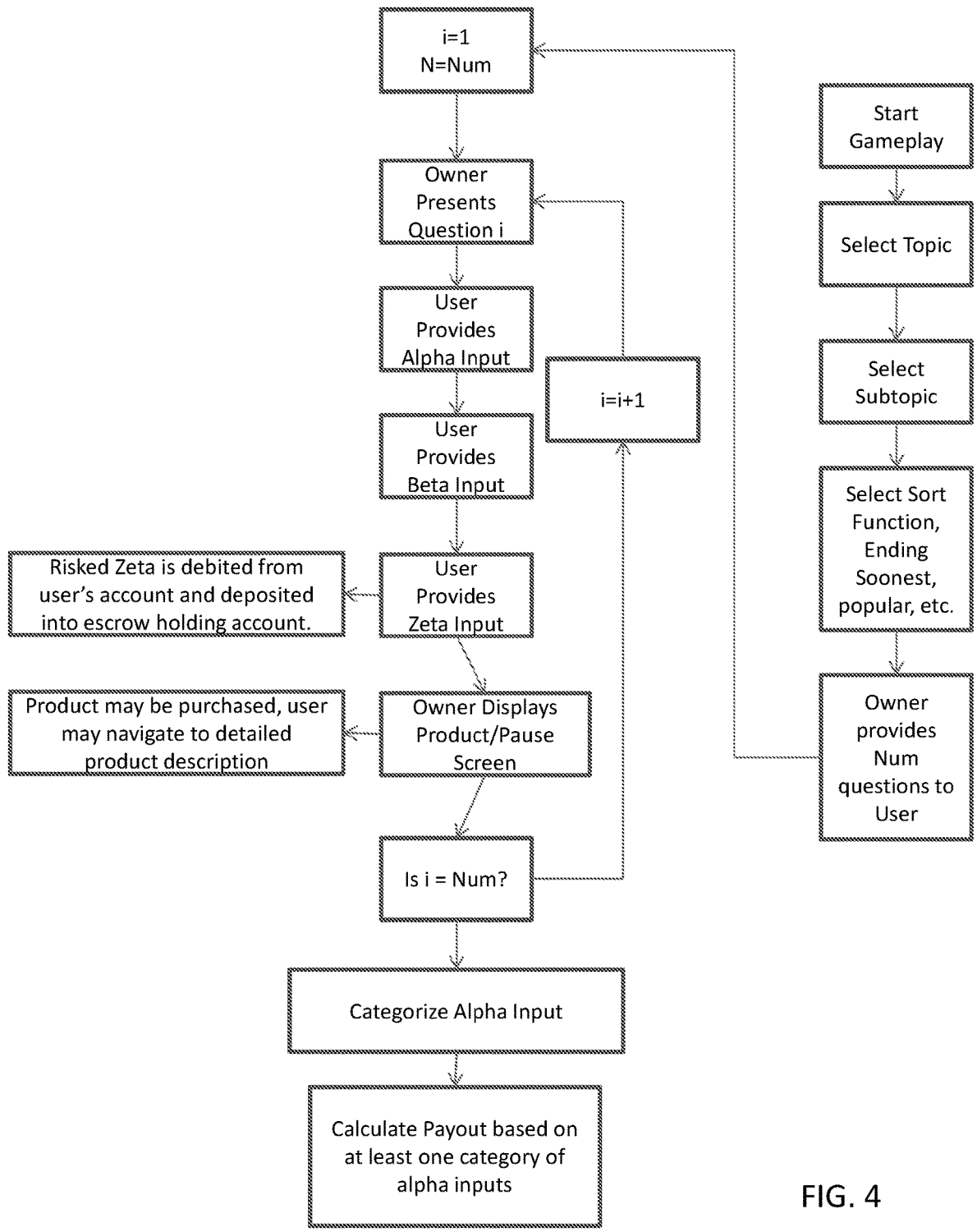
FIG. 4 is a view of a method in accordance with example embodiments.
Figure 12:
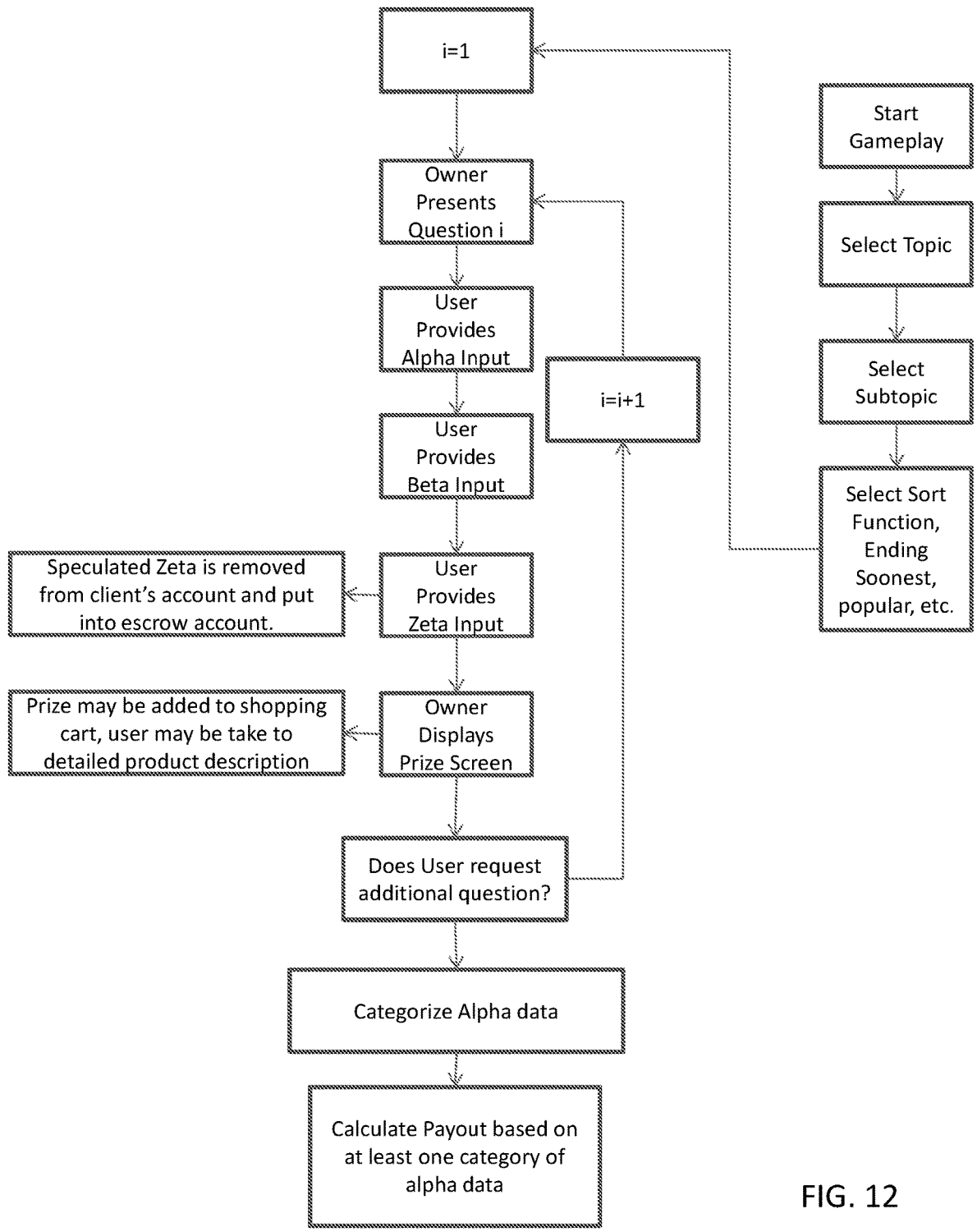
FIG. 12 is a view of a method in accordance with example embodiments.

FIGS. 4 and 12 present a method which is substantially the same as FIGS. 3 and 11. However, the methods of FIGS. 4 and 12 include a step where the zeta speculated by a user may be removed from the user's account and put into an escrow account. In addition, the product/pause screen may give a user an option of adding a product to a shopping cart or take the user to a detailed product description. Furthermore, these methods introduce a method of categorizing alpha inputs. In these specific nonlimiting examples, the alpha inputs may be categorized based on certain parameters and user habits and only some of the alpha inputs may be used to determine the payout. In these particular nonlimiting examples, alpha inputs may be categorized after all of the questions presented to a user have been asked.

Figure 5:
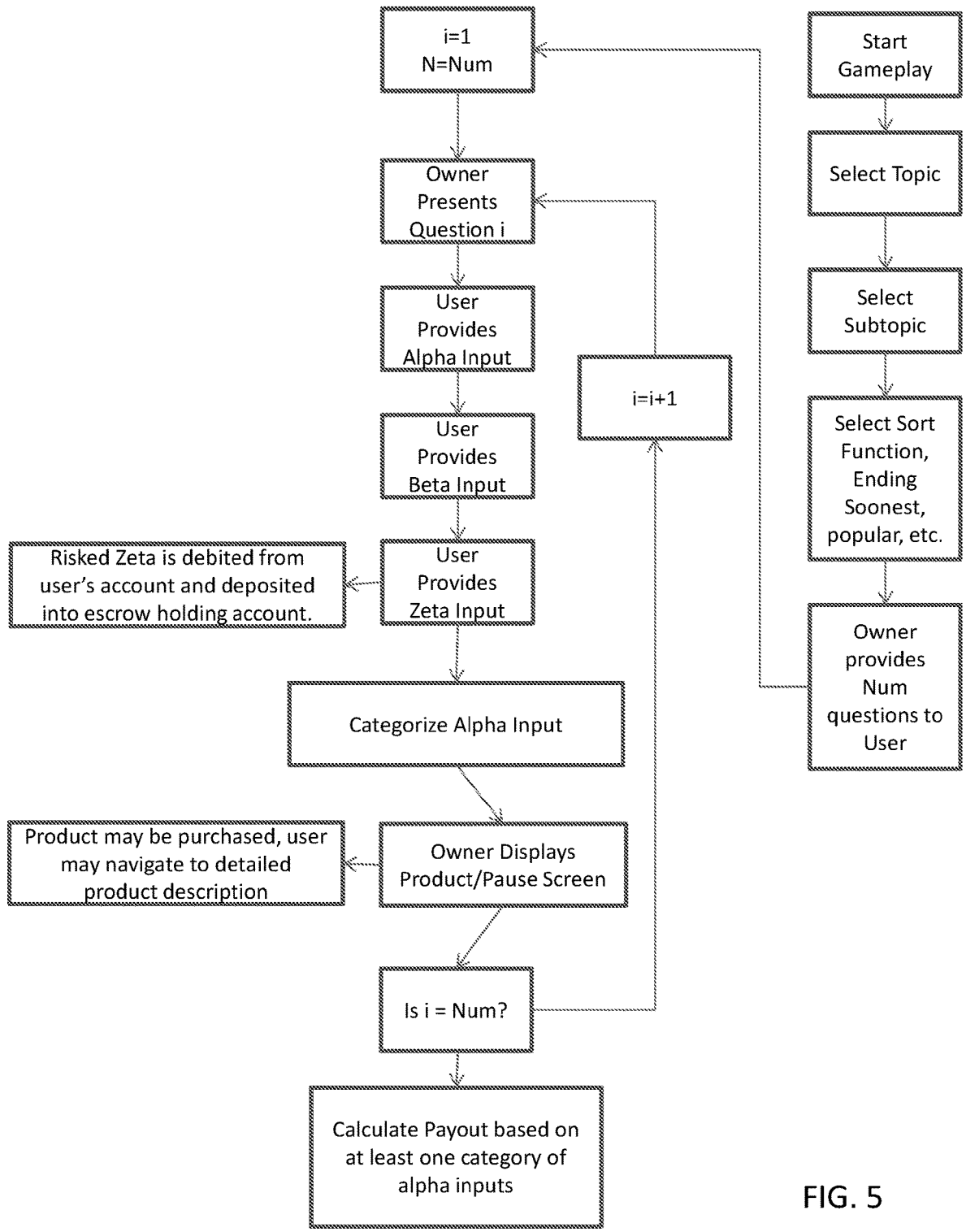
FIG. 5 is a view of a method in accordance with example embodiments.
Figure 13:
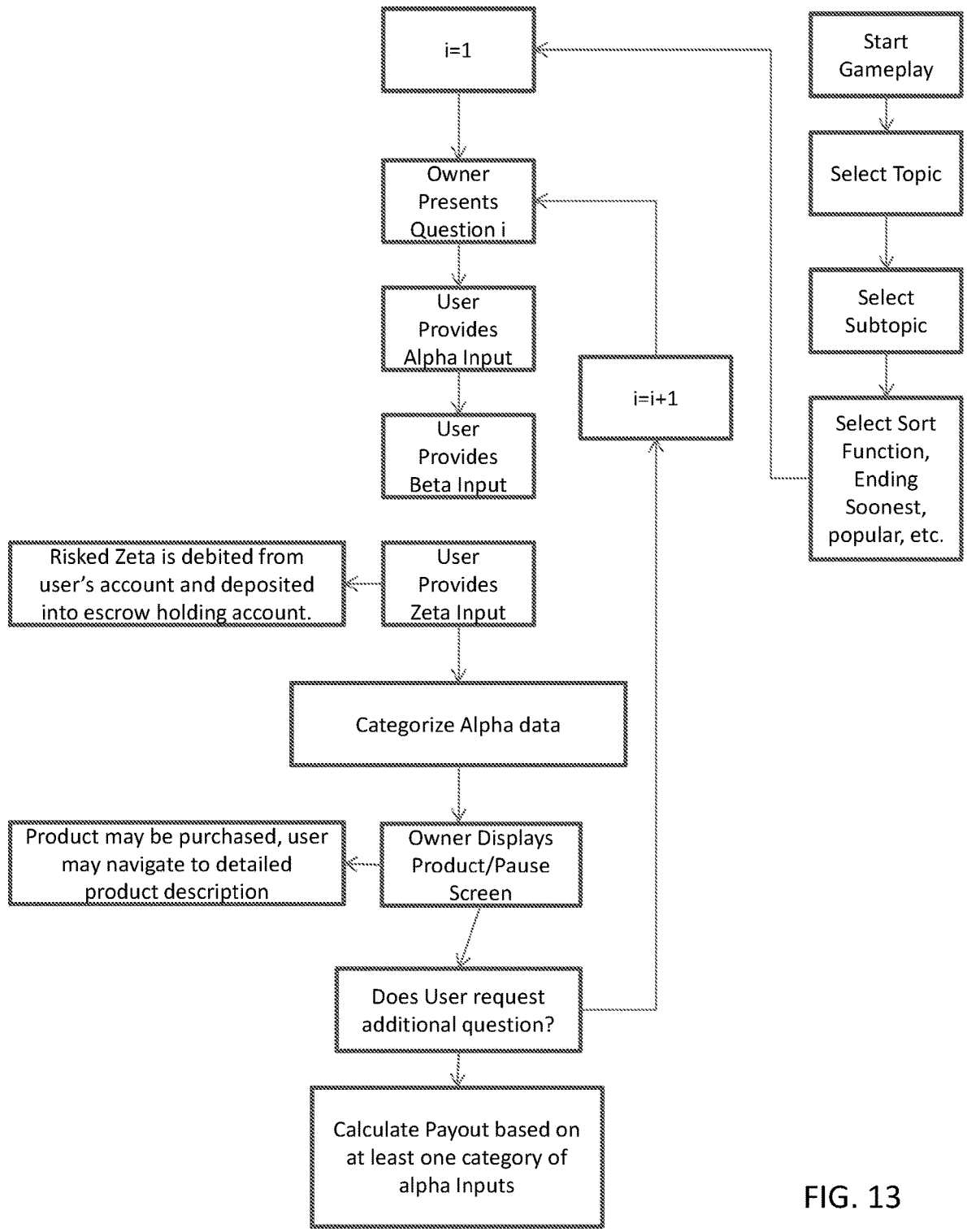
FIG. 13 is a view of a method in accordance with example embodiments.

FIGS. 5 and 13 are further examples of a method in accordance with example embodiments. These methods may be somewhat similar to the methods illustrated in FIGS. 4 and 12, however, in these nonlimiting examples, the alpha input is categorized and stored in a database after each zeta input is provided.

Figure 6:
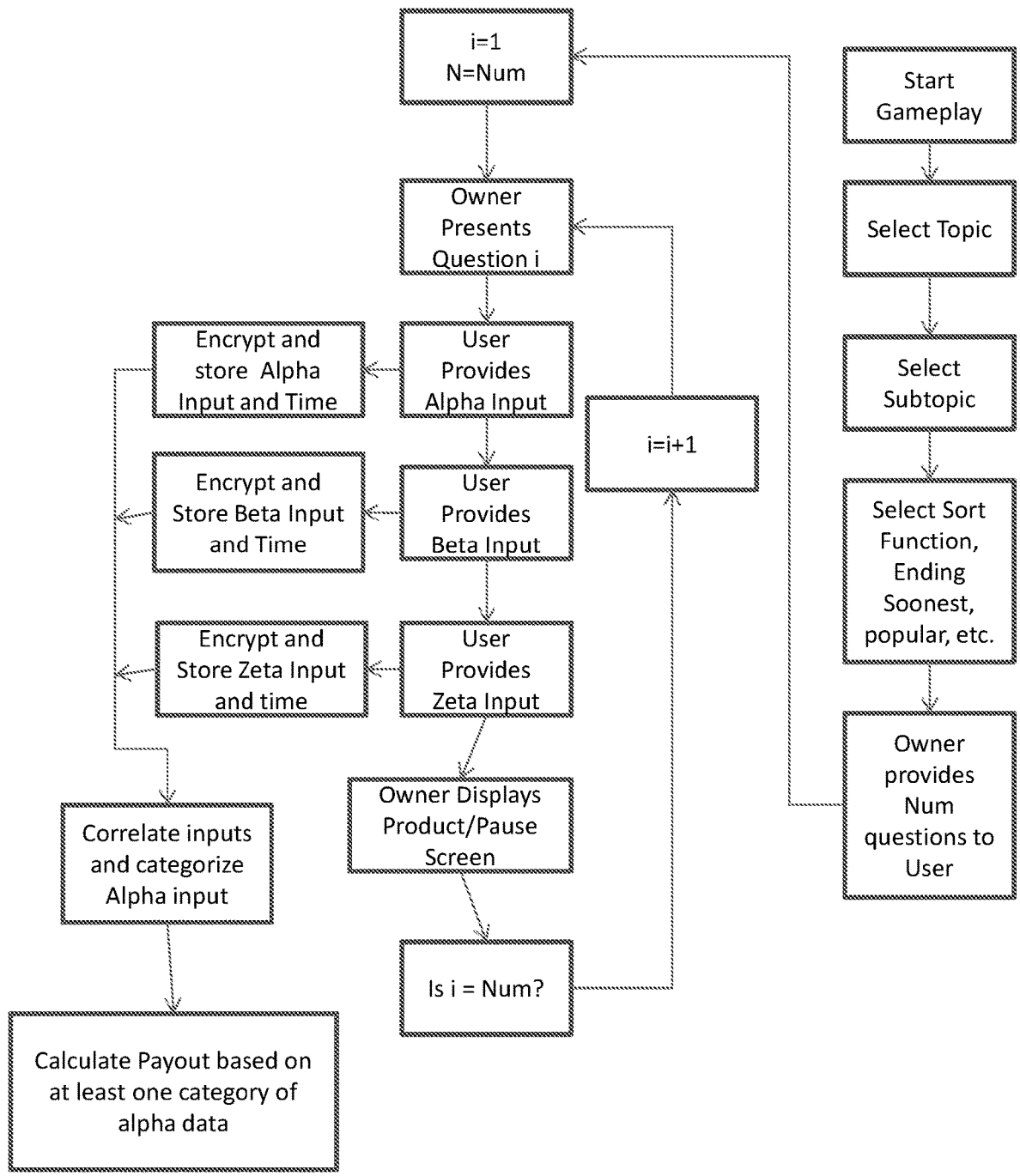
FIG. 6 is a view of a method in accordance with example embodiments.
Figure 14:
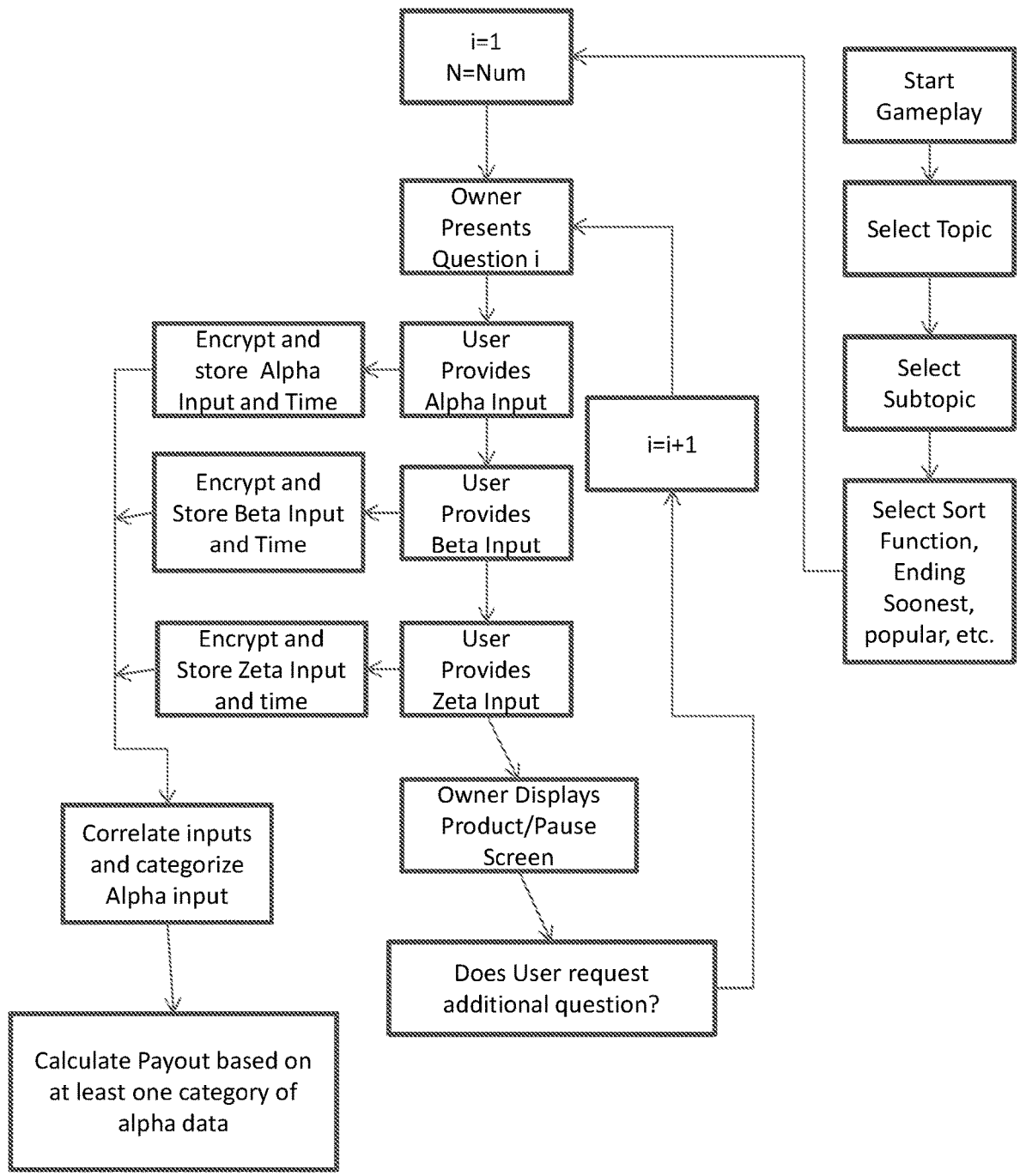
FIG. 14 is a view of a method in accordance with example embodiments.

FIGS. 6 and 14 are further examples of a method in accordance with example embodiments. As shown in FIGS. 6 and 14, the alpha, beta, and zeta inputs produced by the user may be encrypted and stored in an electronic database. Because encrypting and storing data is relatively well known in the art, a detailed description thereof is omitted for the sake of brevity.

Figure 7:
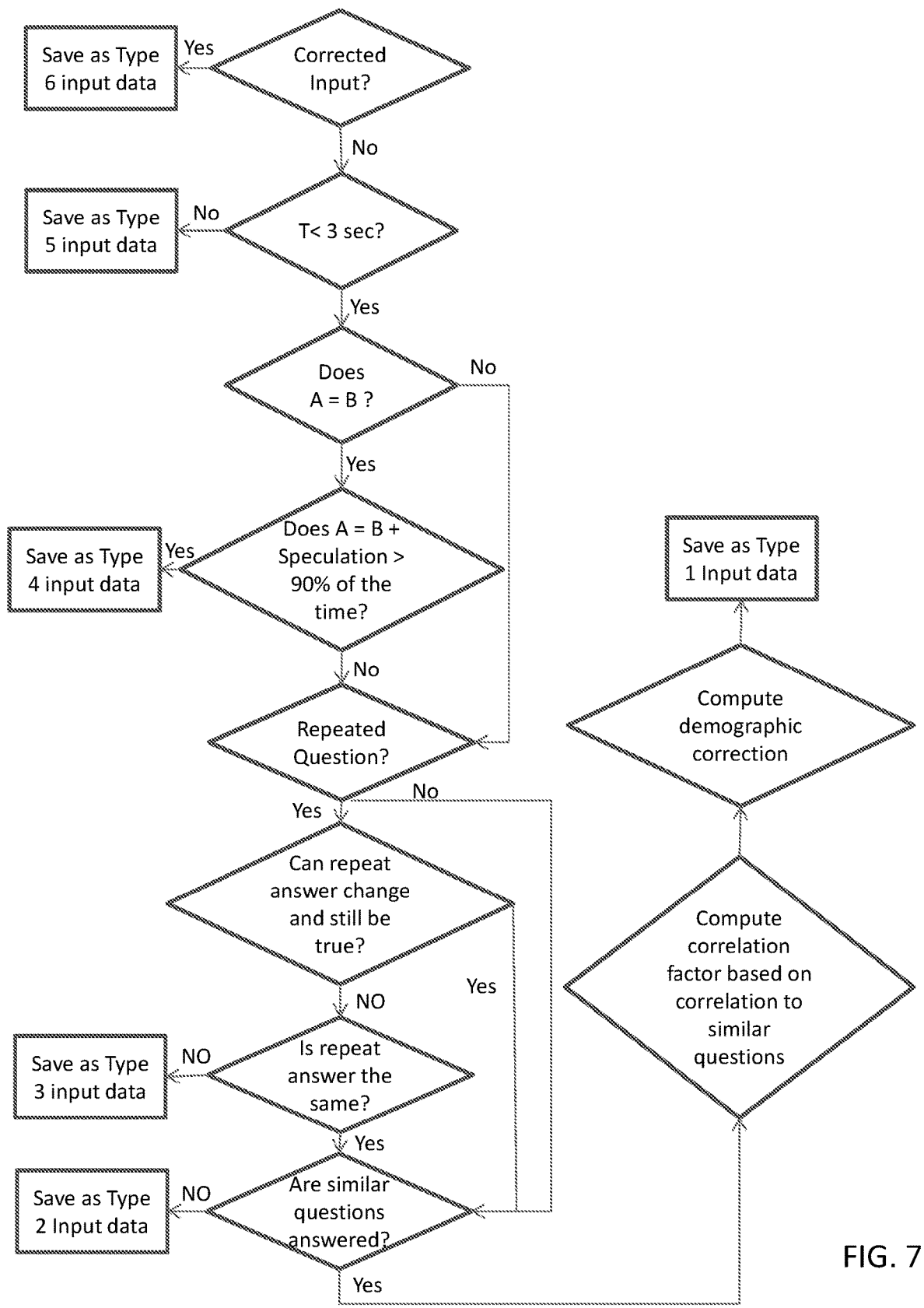
FIG. 7 is a view of a method in accordance with example embodiments.

FIG. 7 is a view of an example method in which an alpha input provided by a user is classified into different categories. Although FIG. 7 illustrates the alpha inputs as falling into one of six different categories, the number of categories may be more or less than six. In fact, the particular criteria illustrated in FIG. 7 is for the purpose of illustration only and may vary from one embodiment to another.

Referring to FIG. 7, the system 100 in accordance with example embodiments may determine whether or not a particular alpha input is classified as "corrected input." In this application the system 100 may offer a user an opportunity to correct an alpha input they may have incorrectly entered. For example, if a user were asked "Do most people rent or own?" and the user entered "Rent" when they meant to enter "Own," the system 100 allows the user to correct the alpha input. The system 100, for example, may provide a "correct previous answer" option or a "back" option to correct the mistake. In example embodiments, the ability to correct a mistake may be for a limited amount of time, for example, five (5) seconds or one (1) minute to keep the player engaged and to prevent the player from researching a question in order to provide what they believe may deem is the correct answer to the question presented. In the event an alpha input is entered by a player and then corrected, this input may be classified as "Type 6" input.

In example embodiments, it is anticipated that some users/players may likely not read a question prior to providing an input. In the event the alpha input entered in response to a question was entered rather quickly, for example, in less than a time period (for example, a preset time period of about three seconds), it may be likely the user did not read the question and simply made a selection. Thus, in this particular nonlimiting example, if the alpha input was not corrected data but the time it took to enter the alpha input was less than three seconds, this alpha input may be classified as "Type 5" data, or any other descriptor as the owner of the system 100 deems fit. Although the timing associated with this latter operation was provided as three seconds, the time is arbitrary and the time associated with this step could be another time period such as two (2) seconds or five (5) seconds or any other time period the owner of the system 100 deems is proper.

In example embodiments, the system 100 may further classify the alpha input as Type 1, Type 2, Type 3, or Type 4. In order to qualify as Type 4 data an alpha input provided by a user for a particular question may be the same as a beta input provided by the user for the particular question and the user may speculate a certain amount of zeta on the particular question. In the event this occurs, a certain portion of the time, say 90% of the time, this input may be classified as Type 4 input.

In the event the user's alpha and beta inputs are different for a particular question the system 100 may then determine whether the question is a repeated question. If it is, the system 100 may determine whether or not a repeat change in an answer can be true. If it cannot and the user provides a different answer to the same question, then this alpha data may be saved as Type 3 data.

If the user does provide a consistent answer to a repeated question, or if the answer of a repeat question can differ and still be true, or if the question is not a repeat question, then the system 100 may determine whether or not similar questions have previously been answered. If not, then the alpha data may be classified as Type 2, if yes, the data may be classified as Type 1.

In example embodiments, a payout for any of the above methods may simply be computed as a function of the alpha data set utilizing all alpha inputs, or in another embodiment, as a function of only some of the alpha inputs comprising the alpha data set. For example, as shown in FIG. 7, the Type 1 data may be augmented or changed by a correlation factor and a demographic correction. The correlation factor (CF), for example, may be based upon correlations to similar questions. For example, in example embodiments, a user may be asked the following question: "Which whiskey do you prefer?" Suppose further there are five similar questions in the database, namely:

1) Do you drink alcohol? Y/N;
2) What is your age range? A13-19/B20-29/C30-44/D45-60/E60+;
3) Are you over 21? Y/N;
4) What type of alcohol do you prefer? AGin/BRum/CTequila/DWhiskey; and
5) Do you drink wine? Y/N.

These questions have different levels of similarity to the question "Which whiskey do you prefer?" and these different levels of similarity may be determined by the question inputters/owner. In this particular nonlimiting example embodiment, the similarity of questions may be ranked between 0 and 1. For example, the similarities the last five questions shared with the question "Which whiskey do you prefer?" may be determined by the inputter/system owner as:

1) 0.9
2) 0.5
3) 0.6
4) 0.6
5) 0.4

In this particular example, suppose the user only answered questions 1, 2, 4, 5. The inputs from these particular questions may be analyzed further. For example, only type 1 and type 2 inputs may be used in computing a correlation factor. Suppose further that only answers for 1, 2, and 5 were of these types. Of these questions, each response may have a certain "corrected user input value" between 0 and 1, which again may be established by a system owner or question inputter.

1) Y=1,N=0
2) A=0,B=1,C=1,D=1,E=1

3) Y=1,N=0
4) A=0.5,B=0.5,C=0.5,D=1
5) Y=1,N=0.3

Suppose further, the particular user selected 1) Y, 2) D, 5) N. In this case, the correlation factor may be computed as: $((0.9\times1)+(0.5\times1)+(0.4\times0.3))/(0.9+0.5+0.4)=1.52/1.8=0.84$. It is noted that the above is merely an example of how a correlation factor may be computed and the invention is not limited by the instant example. As for the demographic correction, each question may have a different desired demographic. For example, the desired demographic for truck buyers may be different from the desired demographic for compact hybrid car buyers. For example, the desired demographic for truck buyers may be defined as American, Male, Over 20, Employed, Business Owner. The desired demographic may generally be the demographic that is assumed to be the most likely of using a product or being impacted by the question. In example embodiments, it may be important to note how the demographic correction works with the Correction Factor (CF) which is essentially the behavioral attributes of the user.

In example embodiments, the demographic correction may be determined by the owner and may be between 0 and 2, or any other range as the owner may deem fit. If the user met all of the criteria they may receive a factor of 2. If the user only met a portion of the criteria the Demographic Correction (DC) may be computed by giving each attribute a different corrected user input value. For example, being male may be deemed more important than being a business owner, so the gender receives greater corrected user input valuing. In a similar way to the CF the demographic correction factor DF may use an averaging concept.

This demographic information may be stored for each user. An example of the corrected user input valueing for each desired group is shown below:
1) Country: America—0.8
2) Gender: Male—0.8
3) Age: Over 20-0.9
4) Employment Status: Employed—0.7
5) Business Owner: Y/N—0.3

Thus, if a user met all criteria the demographic factor may be computed as:

$$2((0.8\times1)+(0.8\times1)+(0.9\times1)+(0.7\times1)+(0.3\times1)/(0.8+0.8+0.9+0.7+0.3)=2$$

However, in example embodiments, different factors may be used if a user doesn't exactly match a specific demographic. For example, if the user was Canadian, the demographic factor for the Canadian may be 0.9 rather than 0.8. This information may be important since many trucks are sold in Canada. In example embodiments, it is possible the system 100 may not have a demographic for a particular user. In this case, the demographic information may simply have a factor of 0.0 or an arbitrarily small number.

In example embodiments, the alpha inputs from a plurality of users will be collected over a discrete period of time. After the discrete period of time elapses, the question will not be presented to a user. Users may only be able to provide one alpha, beta, and zeta input per question. After the discrete period of time elapses the alpha inputs collected from the plurality of users will be collected and a distribution of alpha inputs for a question will be computed. In example embodiments, the payout for a user may be dependent on the type 1, 2, 3, 4, 5, and/or 6 alpha inputs collected from the plurality of users and whether or not a player receives a payout may be dependent on their beta input. For example, suppose ten thousand users were presented with the question "Do most people rent or own?" Suppose further that of the ten thousand users seven thousand's alpha input (type 1) was "own" and three thousand's alpha input (type 1) was "rent." Suppose further a user provided alpha input of "rent," but beta input of "own." Suppose further, the owner determined the payout should be based only on type 1 alpha inputs. Because the user's beta input matched the most popular type 1 alpha input, the user may win a certain amount of currency provided their zeta input for the question was not 0 or was not skipped.

Figure 8:
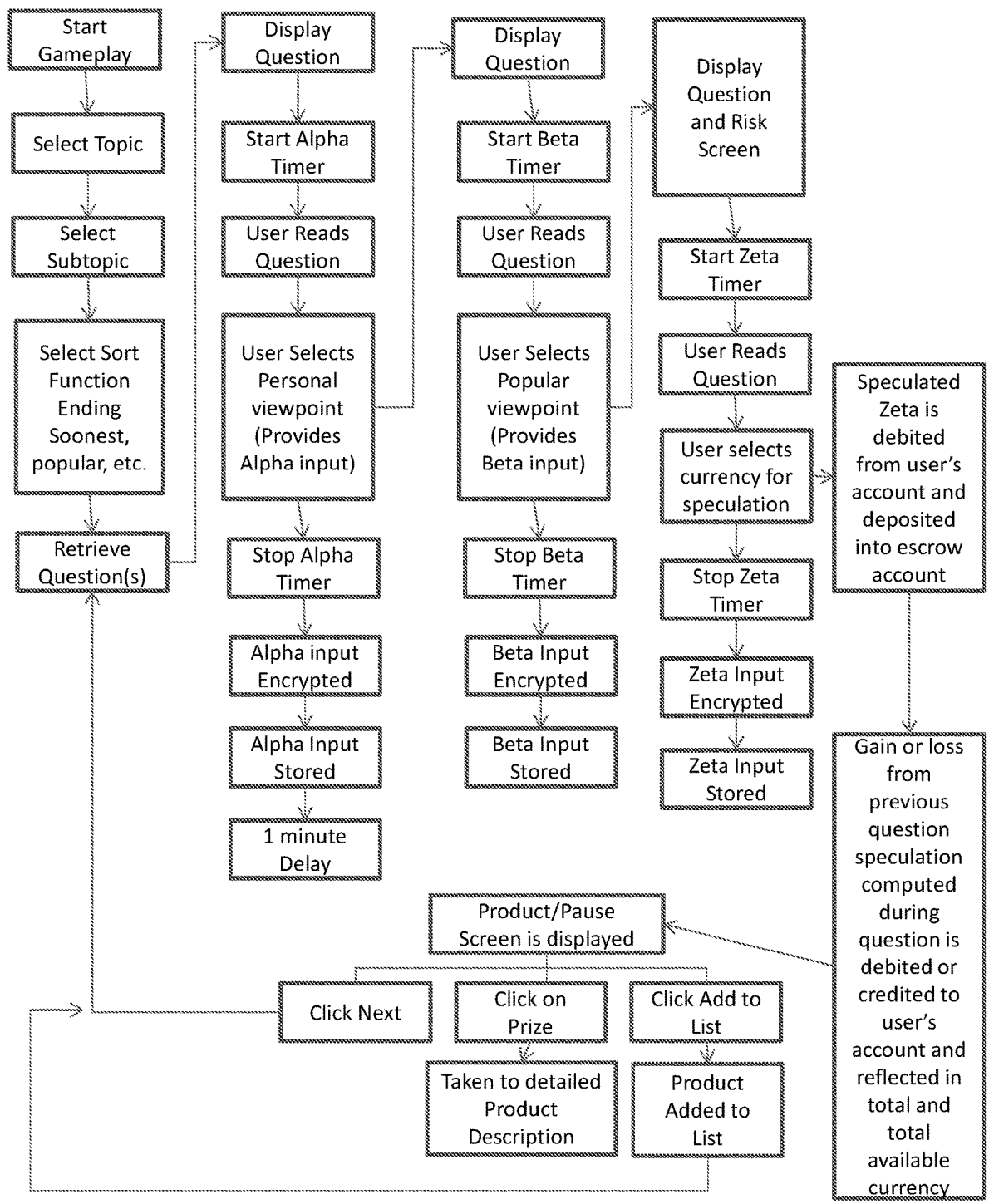
FIG. 8 is a view of a method in accordance with example embodiments.

FIG. 8 is a view of another method in accordance with example embodiments. Consistent with the earlier examples, the method of FIG. 8 may include operations of allowing a user, via the user interface 10, to select a topic, a subtopic, or another category such as popular questions in order to cause the system 100 to provide a plurality of questions to the user. In this particular nonlimiting example embodiment, the system 100 may display a question to the user which may start an alpha timer. The alpha timer may be a smart timer which may vary from question to question depending on certain factors such as, but not limited to, the number of characters in a question, the number of potential answers for a question, the number of characters in the answers, the gameplay habits of the user, and/or the general difficulty of the question. In the method of FIG. 8, after the timer begins the user may read the question, provide alpha input related to the question (for example, provide a personal viewpoint of the data). After the alpha input is provided the alpha timer may stop, the alpha data may be encrypted, and the alpha input, including selection and time to make selection may be stored in an electronic database, for example, the database 25 of system 100. In example embodiments it is understood that if the user does not answer a question within a given time period tracked by the alpha timer the question is withdrawn from the user's consideration and an "out of time" screen is presented to the user with the option to continue wherein another question is presented to the user.

In FIG. 8, the system 100, after the alpha input is provided by the user, may redisplay the question. As soon as the question is redisplayed the system 100 may start a beta timer and the user may then read the question and provide beta input. Providing the beta input stops the beta timer after which the beta input may be encrypted and stored in the electronic database 25. In example embodiments, the beta timer, like the alpha timer, may be, but is not required to be, a smart timer which may vary from question to question depending on certain factors such as, but not limited to, the number of characters in a question, the number of potential answers for a question, the number of characters in the answers, the gameplay habits of the user, and/or the general difficulty of the question. In example embodiments it is understood that if the user does not answer a question within a given time period tracked by the beta timer the question may be withdrawn from the user's consideration and another question is presented to the user.

In FIG. 8, the system 100, after the beta input is provided by the user, may redisplay the question a third time. As soon as the question is redisplayed the system 100 may start a zeta timer and the user may then read the question and provide zeta input which may be currency speculated by the user and amount of time to make selection. Providing the zeta data may stop the zeta timer after which the zeta input may be encrypted and stored in the electronic database 25. In example embodiments, the zeta timer, like the alpha timer, may be, but is not required to be, a smart timer which may vary from question to question depending on certain factors such as, but not limited to, the number of characters in a question, the number of potential answers for a question, the number of characters in the answers, the gameplay habits of the user, and/or the general difficulty of the question. In example embodiments it is understood that if the user does not answer a question within a given time period tracked by the zeta timer the question may be withdrawn from the user's consideration and another question may be presented to the user.

In the method of FIG. 8, speculated/risked currency (for example, zeta) may be debited from a user's account and put into an escrow account. Gains or losses from previous speculations may be updated to the user's account so the user may learn the amount of currency the user may have for speculation.

In the method of FIG. 8, the system 100 may cause the user interface 10 to generate a product/pause screen after the zeta input is entered. In example embodiments, the user interface 10 may be configured to allow the user to either prompt the system 100 to provide another question, provide a detailed description of the product, or add the product to a list for purchase/viewing at a later date.

Though not specifically shown in FIG. 8, the method classifying alpha input illustrated in FIG. 7 may be used classify to the alpha input after the alpha and beta inputs for a particular question have been entered. Thus, the method of FIG. 8 may also include the method steps of FIG. 7.

Figure 9:
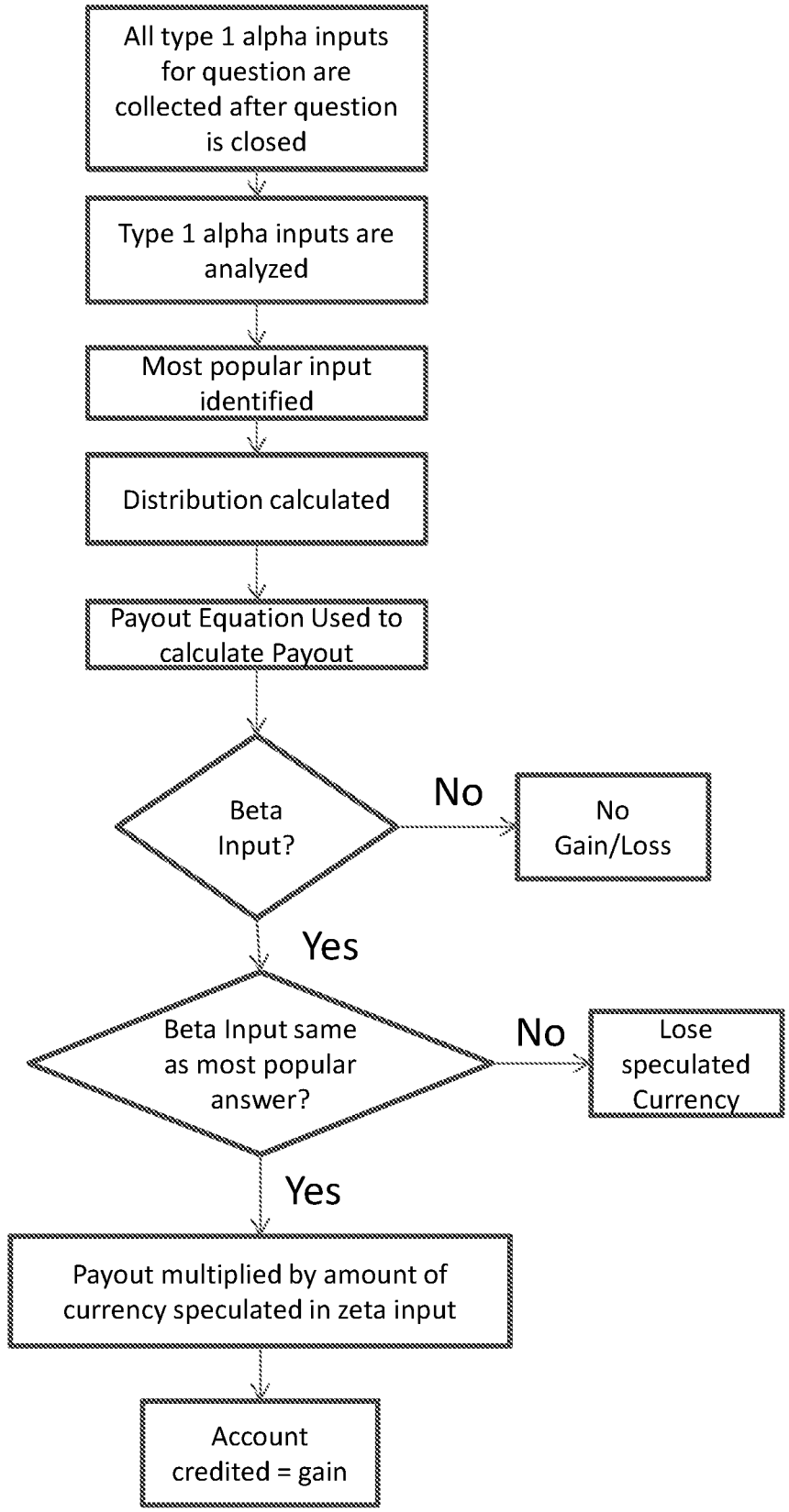
FIG. 9 is a view of a method in accordance with example embodiments

FIG. 9 is a view of a method of calculating a payout for a user/player. As indicated previously, a user may provide alpha input, beta input, and zeta input. A user utilizing the system 100 has an opportunity to risk currency and receive a payout. In order to receive a payout, the user's beta input must match a group's most popular alpha input, or a most popular alpha input in a type of alpha input. That is, the user must correctly predict what the most popular and answer of a given question is in order to receive a payout. In the example of FIG. 9, this corresponds to the most popular type 1 input provided by a plurality of users, however, it could have corresponded to the most popular type of type 2, 3, 4, 5, or 6 input, or simply the most popular alpha input. Once the type 1 alpha input is collected from all users the type 1 alpha data set may be analyzed, the distribution is calculated, and the most popular answer is determined. A payout equation for calculating a payout based on the most popular answer and the distribution is used to calculate a payout. If a particular user's beta input matched the most popular alpha input the user may receive a payout which may be a multiple of the zeta risked by the user and the user's account may be credited. If the user's beta input did not match the most popular answer, the user may simply lose the risked zeta.

Figure 15:
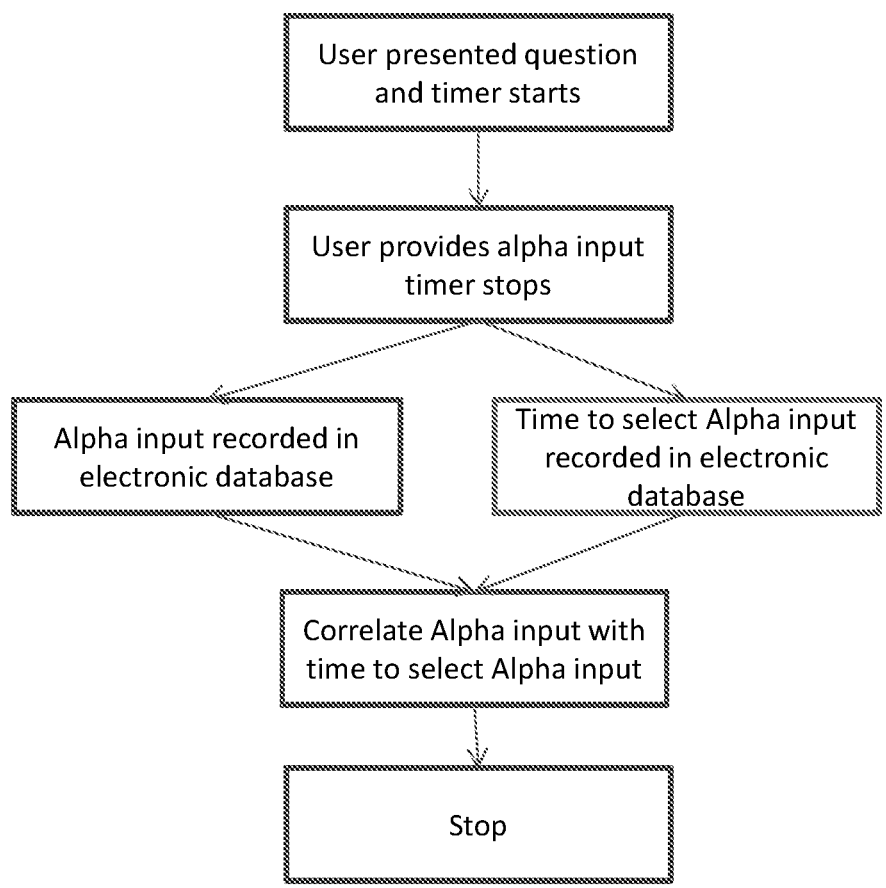
FIG. 15 is a view of a method in accordance with example embodiments.

Example embodiments are not intended to be limited by the aforementioned methods. For example, FIG. 15 illustrates a method of collecting and refining data in accordance with another example embodiment. The instant example embodiment may, for example, be implemented on system 100. For example, in this example embodiment the network system 20 may cause the user interface 10 to display a question on a screen and start a timer. User may not be aware of timer. A user may provide alpha input for the question and the system 100 may stop the timer in response to the user providing the alpha input. The alpha input and the time spent selecting the alpha input for the question may be recorded in an electronic database, for example, the electronic database 25. In this particular nonlimiting example the system 100 may classify the alpha data based on the time the user spent answering the question. For example, a user who spent little time reading a question and providing input for the question may simply have found the question uninteresting and therefore did not spend much time on his/her input. The user may have also not read the question and simply selected an input. This input may, therefore, be unreliable. As such, the system 100 may be configured such that if the user spent less than a predetermined or preset amount of time (for example, one second, two seconds, or three seconds) answering a question and providing the alpha input the alpha input may be categorized as a type 2 data. If, on the other hand, the user spent more than the preset or predetermined amount of time answering the question the data may be stored as type 1 data. In this particular nonlimiting example, the type 1 data may represent more accurate data and therefore may be more desirable than the type 2 data. It is understood that other relevant refining processes may exist based upon the collection of Alpha input and time to select alpha input. Also, in this example embodiment, a payout may be calculated based on the type 1 data. Finally, in the nonlimiting example of FIG. 15 the user may request another question to continue the game play or end the game play.

Figure 16:
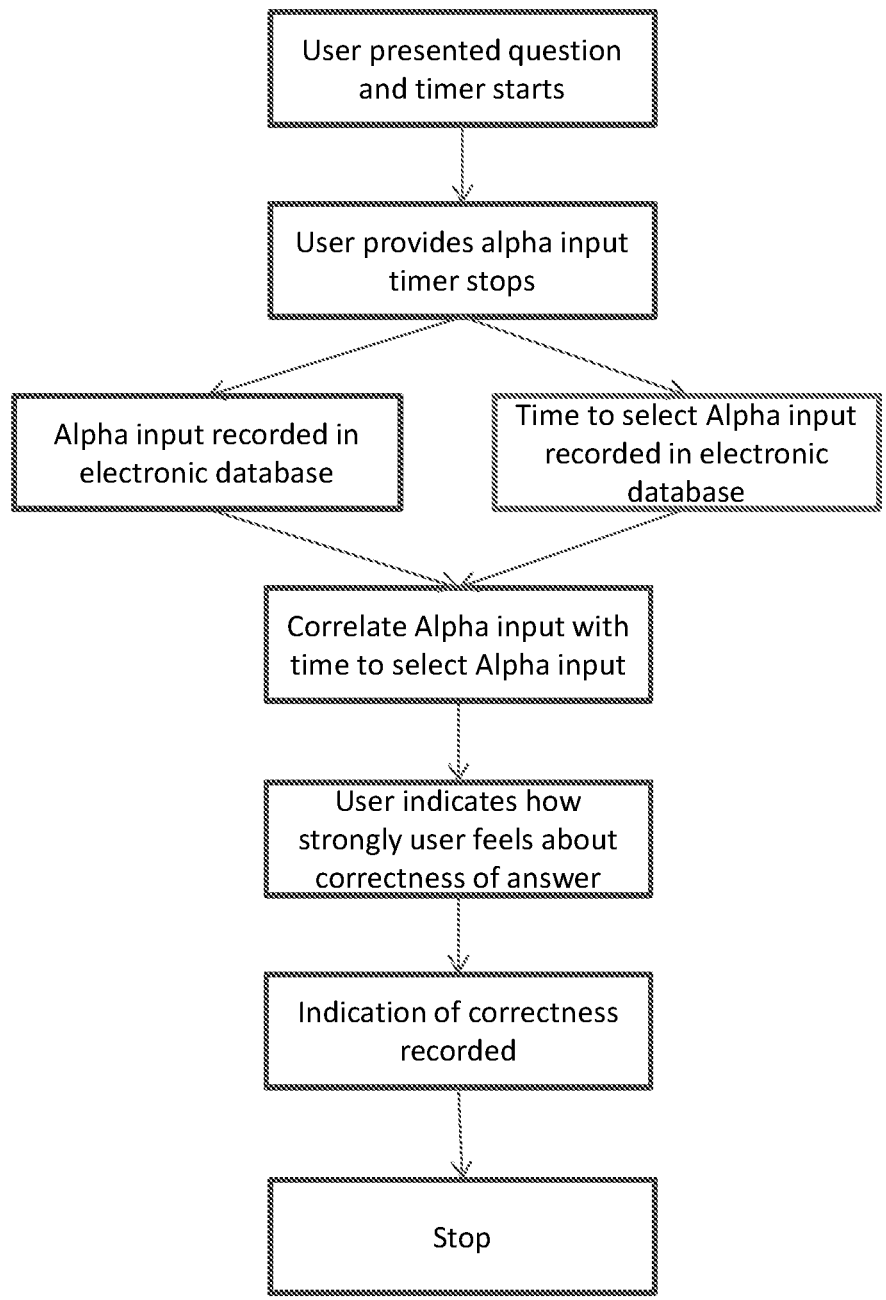
FIG. 16 is a view of a method in accordance with example embodiments.

FIG. 16 is another example of a method in accordance with example embodiments. The embodiment of FIG. 16 may be substantially similar to that of FIG. 15 except that the embodiment of FIG. 16 includes an extra data input related to how strongly a user feels regarding the alpha input. For example, the system 100 may, in addition to providing a question to the user, request the user indicate how strongly they feel the input provided was correct. This could be in the form of a sliding scale or a number ranging from 1 to N with N indicating very confident and 1 indicating not very confident. In this particular example, N may be any number deemed appropriate by the system owner. For example, N may be 1, 2, 5, or 10.

Figure 17:
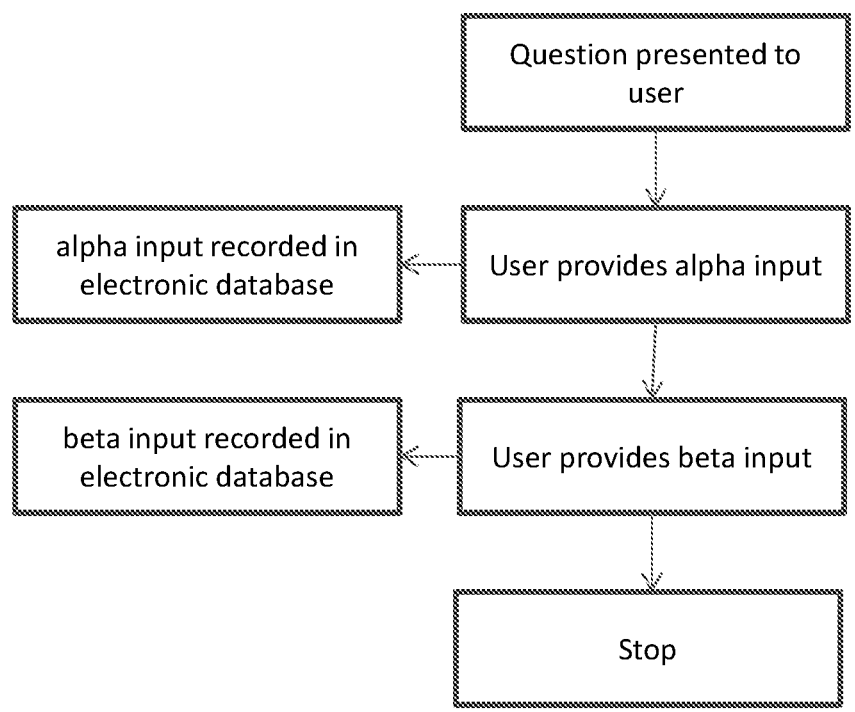
FIG. 17 is a view of a method in accordance with example embodiments.

FIG. 17 illustrates another example of a method in accordance with example embodiments. As in the previously described embodiments, the method of FIG. 17 may be implemented on the system 100. For example, in the method of FIG. 17, the network 20 may cause the user interface 10 to display a question and the user may enter both alpha and beta input regarding the question. This alpha and beta input may be stored in an electronic database, for example, the database 25 of system 100. The alpha and beta input may not include a time to select input. Finally, in the nonlimiting example of FIG. 17 the user may request another question to continue the game play or end the game play.

Figure 18:
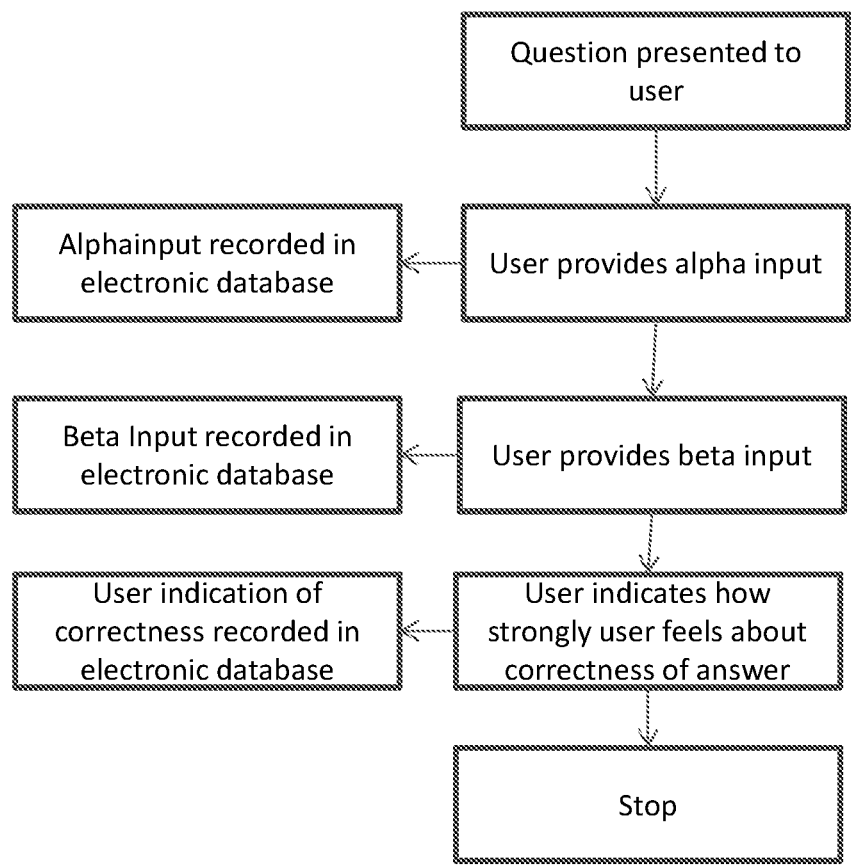
FIG. 18 is a view of a method in accordance with example embodiments.

FIG. 18 illustrates another example embodiment. As in the previously described embodiments, the method of FIG. 18 may be implemented on the system 100. For example, in the method of FIG. 18, the network 20 may cause the user interface 10 to display a question and the user may enter both alpha and beta input regarding the question. This alpha and beta input may be stored in an electronic database, for example, the database 25 of system 100. Furthermore, in the method of FIG. 18, the user may be prompted to provide information as how confident they are in their beta input and this input may be saved in the electronic database. This could be in the form of a sliding scale or a number ranging from 1 to N with N indicating very confident and 1 indicating not very confident. In this particular example, N may be any number deemed appropriate by the system owner. For example, N may be 1, 2, 5, or 10. Finally, in the nonlimiting example of FIG. 18 the user may request another question to continue the game play or end the game play.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A method of collecting data comprising:
presenting a plurality of user interfaces on a plurality of electronic devices, each of the plurality of electronic devices operably coupled to a network system, the network system including at least one processor and an operably coupled memory, and a database;
presenting, on the plurality of user interfaces, a plurality of questions to a plurality of users;
dynamically calculating, with the at least one processor, a time window for each of the plurality of questions using a smart timer, the time window including:
a minimum time calculated based on at least a question attribute, an answer attribute, and previous inputs by the user stored in the database;
a maximum time calculated based on at least a question attribute, an answer attribute, and previous inputs by the user stored in the database;
obtaining a plurality of alpha, beta, and zeta inputs from each of the plurality of users at the network system through the plurality of user interfaces, wherein an alpha, a beta, and a zeta input from a user is obtained for each of the plurality of questions within the time window calculated by the smart timer for each question;
storing the plurality of alpha, beta, and zeta inputs in the database;
computing, with the at least one processor, question payouts for each user based on a distribution of alpha data, the user's beta input, the user's zeta input, and the user's time for each input as determined by the smart timer, wherein computing question payouts includes determining a most popular answer within an alpha data set and determining whether a user's beta input matches the most popular answer within the alpha data set and crediting a player's account includes crediting a player's account when the player's beta input matches the most popular answer within the alpha data set, and wherein a more even distribution of alpha data increases a payout and a less even distribution of alpha data decreases the payout, and weighting the input from the user less when a user's time for the input is less than the minimum time for a particular question compared to when a user's time for the input is greater than the minimum time for a particular question; and
crediting, with the at least one processor, a player's account with the computed payouts.

2. The method of claim 1, further comprising:
categorizing the alpha input, wherein the distribution of alpha data is performed on at least one, but not all, of the categorized of alpha data.

3. The method of claim 1, further comprising:
calculating a correlation factor and augmenting a user's alpha input with the correlation factor.

4. The method of claim 3, further comprising:
calculating a demographic correction and augmenting the user's alpha input with the demographic correction.

5. The method of claim 4, wherein the correlation factor and demographic correction are calculated only for one type of alpha input.

6. The method of claim 1, further comprising:
providing a user an option to purchase a product.

7. The method of claim 1, further comprising:
placing at least some of a user's currency in an electronic escrow account while a payout is calculated.

8. A computer system having a non-transitory computer readable-medium configured to:
present a plurality of user interfaces on a plurality of electronic devices, each of the plurality of electronic devices operably coupled to a network system, the network system including at least one processor and an operably coupled memory, and a database;
present, on the plurality of user interfaces, a plurality of questions to a plurality of users;
dynamically calculate, with the at least one processor, a time window for each of the plurality of questions using a smart timer, the time window including:
a minimum time calculated based on at least a question attribute, an answer attribute, and previous inputs by the user stored in the database;
a maximum time calculated based on at least a question attribute, an answer attribute, and previous inputs by the user stored in the database;
obtain a plurality of alpha, beta, and zeta inputs from each of the plurality of users at the network system through the plurality of user interfaces, wherein an alpha, a beta, and a zeta input from a user is obtained for each of the plurality of questions within the time window calculated by the smart timer;
store the plurality of alpha, beta, and zeta inputs in the database;
compute, with the at least one processor, question payouts for each user based on a distribution of alpha data, the user's beta input, the user's zeta input, and the user's time for each input as determined by the smart timer, wherein computing question payouts includes determining a most popular answer within an alpha data set and determining whether a user's beta input matches the most popular answer within the alpha data set and crediting a player's account includes crediting a player's account when the player's beta input matches the most popular answer within the alpha data set, and wherein a more even distribution of alpha data increases a payout and a less even distribution of alpha data decreases the payout, and weighting the input from the user less when a user's time for the input is less than the minimum time for a particular question compared to when a user's time for the input is greater than the minimum time for a particular question; and
credit, with the at least one processor, a player's account with the computed payouts.

9. The system of claim 8, further comprising:
categorize the alpha input, wherein the distribution of alpha data is performed on at least one, but not all, of the categorized of alpha data.

10. The system of claim 8, wherein the system is further configured to:
calculate a correlation factor and augmenting a user's alpha input with the correlation factor.

11. The system of claim 10, wherein the system is further configured to:
calculate a demographic correction and augment the user's alpha input with the demographic correction.

12. The system of claim 11, wherein the correlation factor and demographic correction are calculated only for one type of alpha input.

13. The system of claim 8, wherein the system is further configured to:
provide a user an option to purchase a product.

14. The system of claim 8, further comprising:
an electronic database configured to escrow at least some of a user's currency to an while a payout is calculated.

\* \* \* \* \*